(12) United States Patent
Honda et al.

(10) Patent No.: US 7,926,838 B2
(45) Date of Patent: Apr. 19, 2011

(54) SIDE IMPACT PROTECTION AIRBAG SYSTEM

(75) Inventors: Kensaku Honda, Aichi-ken (JP); Koji Shibayama, Aichi-ken (JP); Yuji Sato, Aichi-Ken (JP); Atsushi Nagata, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 150 days.

(21) Appl. No.: 12/320,958

(22) Filed: Feb. 10, 2009

(65) Prior Publication Data

US 2009/0212539 A1    Aug. 27, 2009

(30) Foreign Application Priority Data

Feb. 22, 2008 (JP) .................................. 2008-041592

(51) Int. Cl.
*B60R 21/207* (2006.01)
*B60R 21/26* (2006.01)

(52) U.S. Cl. ............... 280/729; 280/730.2; 280/736; 280/740; 280/741; 280/742

(58) Field of Classification Search .............. 280/729, 280/730.2, 736, 740, 741, 742
See application file for complete search history.

(56) References Cited

U.S. PATENT DOCUMENTS

| | | | | |
|---|---|---|---|---|
| 5,779,263 A * | 7/1998 | Lane et al. | ............... | 280/730.2 |
| 5,803,486 A * | 9/1998 | Spencer et al. | ............ | 280/728.2 |
| 5,853,191 A * | 12/1998 | Lachat | ................. | 280/730.2 |
| 5,918,898 A * | 7/1999 | Wallner et al. | ............. | 280/728.2 |
| 6,270,113 B1 * | 8/2001 | Wipasuramonton et al. | ............ | 280/730.2 |
| 6,279,944 B1 * | 8/2001 | Wipasuramonton et al. | ............ | 280/730.2 |
| 6,612,610 B1 * | 9/2003 | Aoki et al. | ............... | 280/730.2 |
| 6,802,529 B2 * | 10/2004 | Takedomi et al. | ............ | 280/729 |
| 7,021,652 B2 * | 4/2006 | Kumagai et al. | ............. | 280/729 |
| 7,364,194 B2 * | 4/2008 | Mabuchi et al. | ............ | 280/741 |
| 7,396,042 B2 * | 7/2008 | Mabuchi et al. | ............ | 280/730.2 |
| 7,431,329 B2 * | 10/2008 | Taguchi et al. | ............. | 280/729 |
| 7,434,832 B2 * | 10/2008 | Umehara | ................. | 280/730.2 |
| 7,448,645 B2 * | 11/2008 | Bederka et al. | ........... | 280/730.2 |
| 7,597,351 B2 * | 10/2009 | Kashiwagi | ................ | 280/730.2 |
| 7,607,682 B2 * | 10/2009 | Kurimoto et al. | ........... | 280/729 |
| 7,637,530 B2 * | 12/2009 | Yamaji et al. | ............. | 280/730.2 |
| 7,658,403 B2 * | 2/2010 | Kawabe et al. | ............ | 280/730.2 |
| 2005/0161927 A1 * | 7/2005 | Yokoyama et al. | ....... | 280/743.1 |
| 2007/0228701 A1 * | 10/2007 | Yamamura | ................ | 280/730.2 |

(Continued)

FOREIGN PATENT DOCUMENTS

JP    A-2005-170362    6/2005
JP    A-2005-178470    7/2005

*Primary Examiner* — Paul N Dickson
*Assistant Examiner* — Laura Freedman
(74) *Attorney, Agent, or Firm* — Posz Law Group, PLC

(57) ABSTRACT

A side impact protection airbag system includes an inflator, a retainer and an airbag. An interior space of the airbag is divided into a pelvis portion protecting chamber and a chest portion protecting chamber by a dividing part. A gas ejecting part of the inflator and an opening in the retainer are provided between a fixing end portion of the airbag and an end portion (a connecting portion) of the dividing part which lies a side facing the fixing end portion. A circumferential portion on a wall part which is separate from the opening is made to constitute an interruption wall which interrupts the passage of an inflation gas to the dividing part side, and the interruption wall is provided between the gas ejecting part and the connecting portion.

8 Claims, 12 Drawing Sheets

U.S. PATENT DOCUMENTS

| | | | |
|---|---|---|---|
| 2007/0284859 A1* | 12/2007 | Kashiwagi | 280/730.2 |
| 2008/0174093 A1* | 7/2008 | Inoue | 280/730.2 |
| 2009/0206585 A1* | 8/2009 | Honda | 280/730.2 |
| 2009/0212542 A1* | 8/2009 | Toda et al. | 280/730.2 |
| 2010/0078919 A1* | 4/2010 | Naruse et al. | 280/728.2 |
| 2010/0140906 A1* | 6/2010 | Honda et al. | 280/730.2 |

* cited by examiner

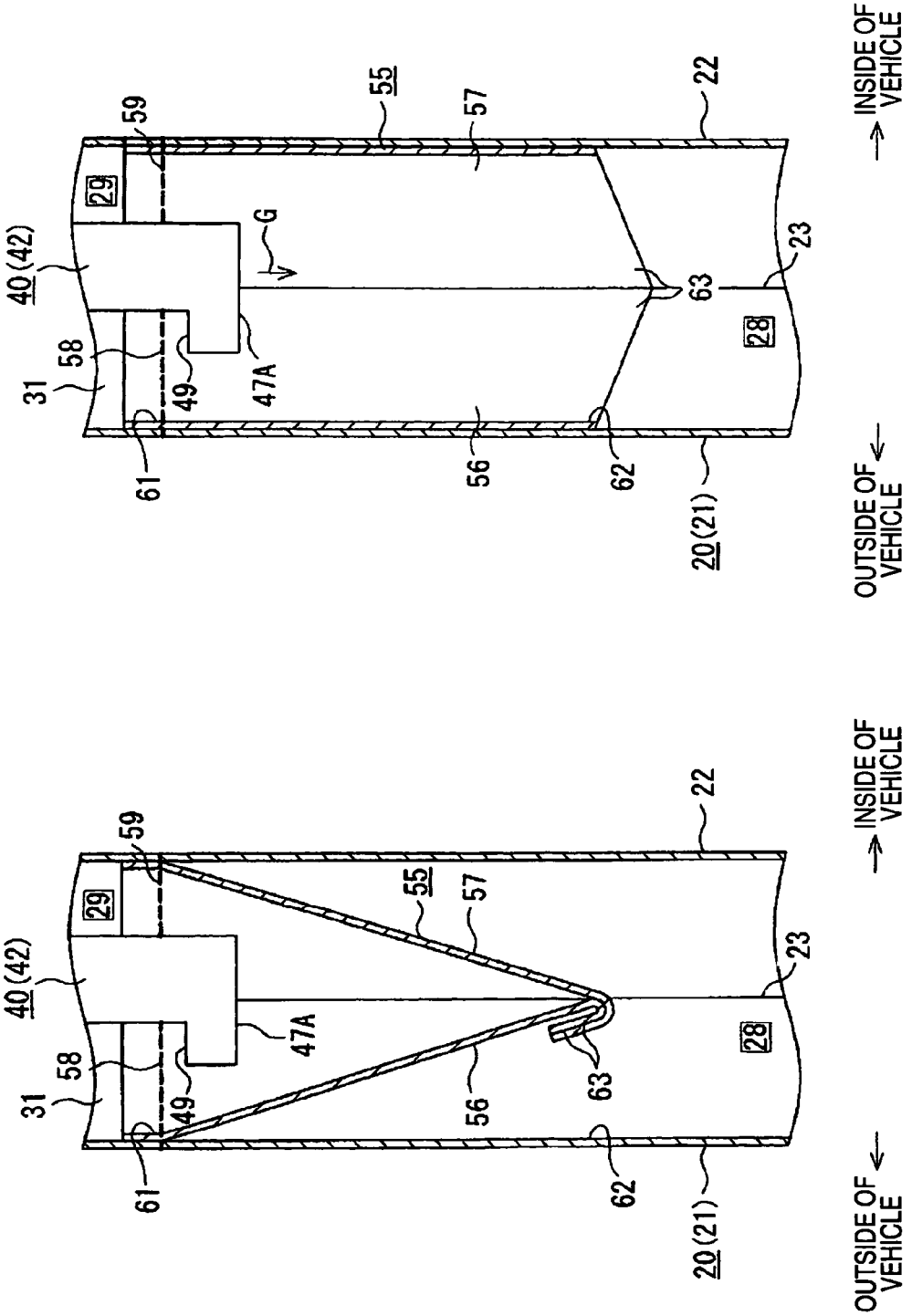

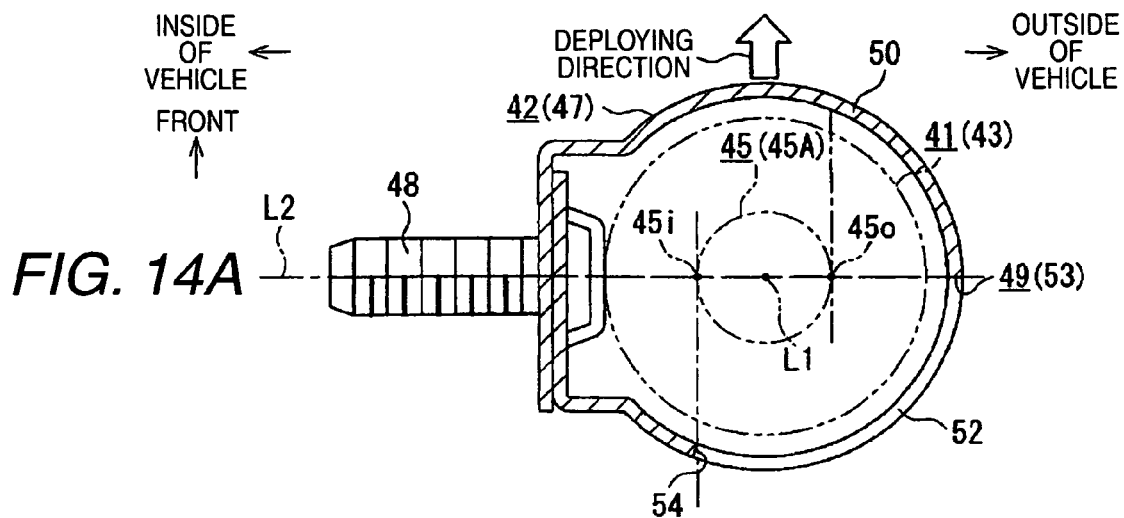
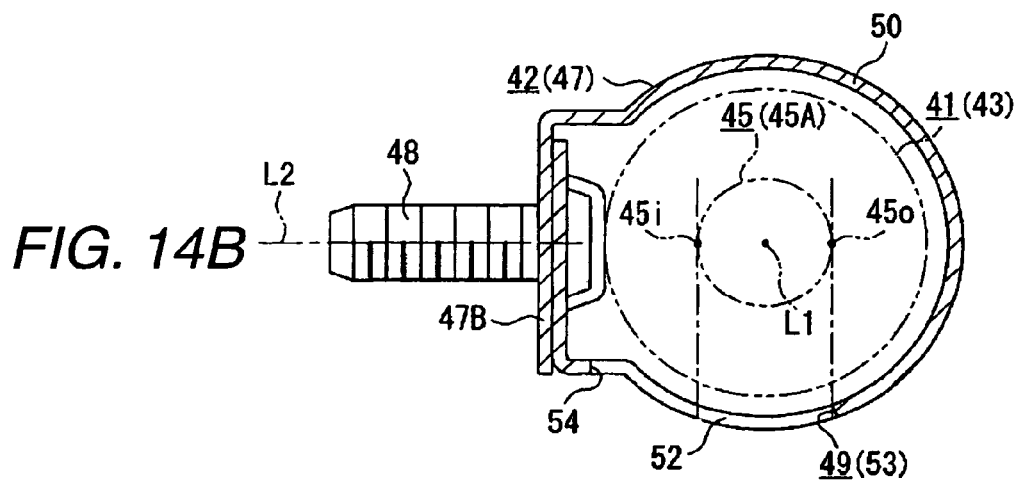
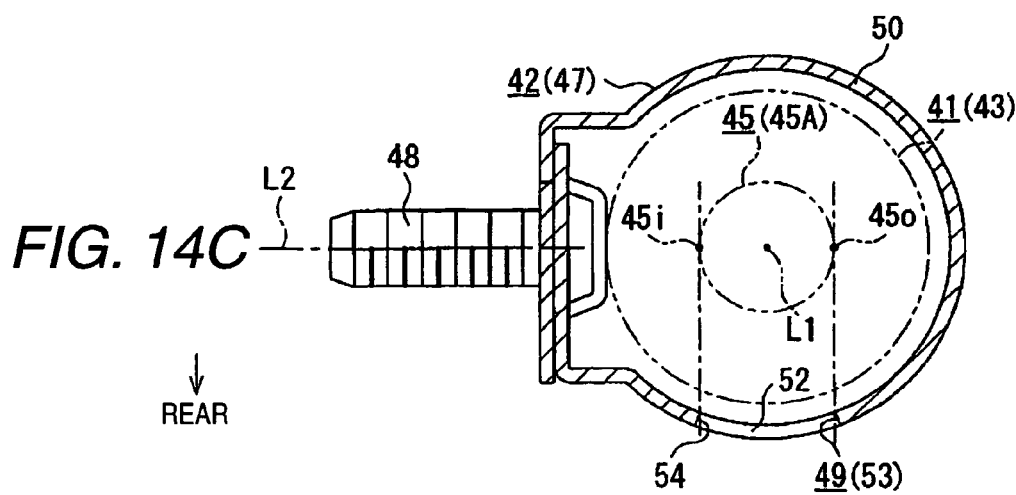

SIDE IMPACT PROTECTION AIRBAG SYSTEM

BACKGROUND OF THE INVENTION

1. Field of the Invention

The present invention relates to a side impact protection airbag system in which when an impact is applied to a vehicle from an outside thereof, an airbag is inflated to be deployed in the vicinity of an outer side of an occupant seated in a vehicle seat so as to restrain the occupant for protection of the occupant from the impact so applied.

2. Related Art

When a vehicle is involved in a sideways collision, a side impact protection airbag system or simply a side airbag system is known as a system for protecting an occupant from an impact which is applied to a body side portion of a vehicle such as a side door from an outer side as a result of the collision. The side airbag system is made up of an inflator, a retainer and an airbag. The inflator has a substantially cylindrical gas ejecting part, and a plurality of gas ejecting holes are provided along substantially the full circumference of an outer circumferential surface of the gas ejecting part, whereby an inflation gas is made to be ejected from the gas ejecting holes in response to an impact applied from an outer side of a vehicle as a result of the vehicle being involved in a sideways collision. The retainer has a tubular wall part which holds the inflator to cover it from an outside. An opening for permitting a passage of at least part of the inflation gas from the gas ejecting part is provided in the wall part in a position lying in the vicinity of the gas ejecting portion.

In addition, when protection objects by the side airbag system includes the pelvis and chest of an occupant, the constituent members (the inflator, retainer and airbag) are accommodated in an external portion of a seatback (a back resting portion) of a vehicle seat. The airbag is fixed to a seat frame within the seatback together with the inflator and the retainer at one end portion (a fixing end portion) thereof.

In the side airbag system, when an impact is applied to the body side portion as a result of the vehicle being involved in a sideways collision, an inflation gas is ejected from the gas ejecting part of the inflator and is then supplied into the airbag. When the inflation gas is supplied thereinto, the airbag projects forwards from the seatback with its fixing end portion left fixed in place in the seatback, passes through a gap defined between the occupant seated in the vehicle seat and the body side portion and is inflated to be deployed into a size and shape which can protect the side portion (the pelvis and chest) of the occupant. The occupant is restrained by the airbag so deployed and the impact that is transmitted to the occupant from the outside through the body side portion is relaxed.

Here, speaking of the resistance to impact of the side part of the human body, it is generally known that the pelvis is superior to a portion lying thereabove, for example, the chest. Because of this, the impact acting on the occupant desirably becomes smaller at the chest than at the pelvis by the inflation and deployment of the airbag.

To make this happen, for example, JP-A-2005-178470 describes a side impact protection airbag system in which an interior space of an airbag is divided into a first chamber and a second chamber lying thereabove by providing a dividing part through sewing, so that an inflation gas ejected from an inflator is distributed more into the first chamber than into the second chamber. In this side airbag system, a gas ejecting part and an opening are provided between a fixing end portion of the airbag and an end portion of the dividing part which lies on a side facing the fixing end portion of the airbag.

According to the side airbag system, the first chamber is inflated and deployed at a higher internal pressure in the vicinity of an outer side of the pelvis having the higher resistance to impact at the side portion of the occupant, while the second chamber is inflated and deployed at a lower internal pressure than the first chamber in the vicinity of an outer side of the chest having the low resistance to impact. In this way, the airbag is inflated and deployed in the pressure distribution which matches the resistance to impact of the side portion of the occupant, whereby the respective body portions of the occupant is protected effectively from the impact resulting from the sideways collision.

Incidentally, in addition to JP-A-2005-178470 that has been described above, JP-A-2005-170362 also describes a retainer of an airbag system. In either of the retainers, the opening is made to open forwards in the deploying direction of the airbag. The one end portion (which lies on the side facing the fixing end portion of the airbag) of the dividing part is positioned in the vicinity of the front of the opening in the deploying direction of the airbag. Because of this, there is a fear that the inflation gas, which is ejected from the gas ejecting part of the inflator, passes through the opening in the retainer and is then forcibly ejected forwards in the deploying direction of the airbag, is caused to strike directly the end portion of the dividing part which was made through sewing to thereby damage the end portion in question.

Consequently, in order to suppress the damage to the dividing part by the inflation gas, countermeasures such as covering the gas ejecting part with an inner tube or reinforcing the dividing part with a reinforcement fabric need to be taken separately.

In addition, this problem can equally occur on a so-called "curtain shield" airbag system in which an airbag is accommodated in a roof side rail near a door to be inflated and deployed between the head of an occupant and a window in the door in response to an impact that is applied from an outer side of a vehicle when the vehicle is involved in a sideways collision, an interior space of the airbag being divided into a plurality of chambers by a dividing part.

SUMMARY OF THE INVENTION

The invention has been made in view of these situations, and an object thereof is to provide a side impact protection airbag system which can suppress the occurrence of the problem that the dividing part is damaged by the inflation gas which is ejected from the gas ejecting part to forcibly strike the dividing part by a simple retainer configuration without using an additional member.

With a view to achieving the object, according to a first aspect of the invention, briefly speaking, there is provided a side impact protection airbag system including an inflator having a substantially cylindrical gas ejecting part and adapted to eject an inflation gas from a plurality of gas ejecting holes on an outer circumferential surface of the gas ejecting part in response to an impact applied to a vehicle from an external direction, a retainer having a tubular wall part for holding the inflator to cover the inflator from an outside thereof and an opening which is provided in a position on the wall part which lies in the vicinity of the gas ejecting part so as to permit the passage of at least part of the inflation gas from the gas ejecting part, and an airbag whose interior space is divided into at least a first chamber and a second chamber by a dividing part and which is fixed to the vehicle at one end portion thereof as a fixing end portion, the gas ejecting part and the opening being provided between the fixing end portion of the airbag and an end portion of the dividing part which lies on a side facing the fixing end portion or in the vicinity thereof, so that the airbag is made to be inflated and deployed towards the vicinity of an outer side of an occupant in a vehicle seat by the inflation gas which is supplied from the retainer into the respective chambers, wherein a circumferential portion on the wall part which is separate from the portion where the opening is formed is provided between the gas ejecting part and the end portion of the dividing part which lies on the side facing the fixing end portion as an interruption wall for interrupting the passage of the inflation gas ejected from the gas ejecting holes to the dividing part side.

According to the configuration described above, when an impact is applied to the vehicle from the outside thereof as a result of the vehicle being involved in a sideways collision, the inflation gas is ejected from the plurality of gas ejecting holes in the gas ejecting part of the inflator. The tubular wall part is placed on the retainer from the outer side thereof, and the opening in the wall part permits the passage of the inflation gas from the gas ejecting holes, while the circumferential portion on the wall part which is separate from the portion where the opening is formed constitutes the interruption wall which interrupts the passage of the inflation gas from the gas ejecting holes.

Here, since the gas ejecting part and the opening are positioned between the fixing end portion of the airbag and the end portion of the dividing part which lies on the side facing the fixing end portion, depending upon the position of the opening on the wall part, there is a fear that the inflation gas ejected from the gas ejecting holes and having passed through the opening strikes forcibly and directly the dividing part.

In the first aspect of the invention, however, since the interruption wall is provided between the gas ejecting part and the end portion of the dividing part which lies on the side facing the fixing end portion, the inflation gas ejected from the gas ejecting holes towards the dividing part strikes the interruption wall to be deflected to change its direction. Consequently, there occurs no such situation that the inflation gas ejected from the gas ejecting holes strikes forcibly and directly the dividing part. In this way, the problem of the damage being made to the dividing part by the inflation gas can be solved by the simple retainer configuration without using any additional member such as an inner tube or a reinforcement fabric.

In addition, a gap defined between the interruption wall and the inflator can constitute a passage for the inflation gas. Because of this, the inflation gas ejected from part of the gas ejecting holes to strike the interruption wall changes its flowing direction to two directions which follow an axis of the gas ejecting part. Then, the inflation gas whose flowing direction has been so changed is supplied into the first chamber and the second chamber. In addition, a gap defined between the retainer and the portion which covers the retainer at the fixing end portion of the airbag can constitute a passage for the inflation gas. Because of this, the inflation gas ejected from part of the gas ejecting holes and having passed through the opening to strike the portion (which covers the retainer at the fixing end portion) of the airbag is deflected to change its flowing direction to the two directions which follow the axis of the gas ejecting part. In this way, the inflation gas is deflected to change its flowing direction to thereby be supplied into the first chamber and the second chamber.

The airbag in which the inflation gas has been supplied into the first chamber and the second chamber is inflated and deployed towards the vicinity of the outer side of the occupant seated in the vehicle seat to thereby restrain the occupant for protection of the occupant from the impact resulting from the sideways collision.

According a second aspect of the invention, briefly speaking, there is provided a side impact protection airbag system as set forth in the first aspect of the invention, wherein the inflator includes a main body portion which is formed into a cylindrical shape having a larger diameter than the gas ejecting part and is provided in such a state the gas ejecting part is positioned on a side facing the first chamber and the main body portion is positioned on a side facing the second chamber.

According to the configuration described above, in the wall part, since the main body portion which is larger in diameter than the gas ejecting part is positioned on the second chamber side and the gas ejecting part is positioned on the first chamber side, the gap defined between the wall part and the main body portion is made smaller than the gap defined between the wall part (the interruption wall) and the gas ejecting part. Because of this, after having been ejected from the gas ejecting part to strike the wall part (the interruption wall), the inflation gas changes its flowing direction to the two directions which follow the axis of the gas ejecting part. However, the inflation gas is made difficult to flow between the wall part and the main body portion where the gap is narrow, that is, into the second chamber, while the inflation gas is made easy to flow between the wall part (the interruption wall) and the gas ejecting part where the gap is wide, that is, into the first chamber. As a result, the inflation gas which has struck the interruption wall to change is flowing direction as has been described above flows more into the first chamber than into the second chamber, whereby the first chamber inflates at a higher internal pressure than the second chamber.

Consequently, for example, in the event that the first chamber is made to inflate in the vicinity of the outer side of the pelvis of the occupant, while the second chamber is made to inflate in the vicinity of the outer side of the chest, the airbag is made to inflate in a pressure distribution matching the resistance to impact of the side portion of the occupant, thereby making it possible to protect effectively the respective body portions of the occupant from the impact resulting from the sideways collision.

According to a third aspect of the invention, briefly speaking, there is provided a side impact protection airbag system as set forth in the first or second aspect of the invention, wherein the opening in the wall part is provided in a location where the gas ejecting part becomes totally invisible from a front side in a direction in which the airbag is deployed but the gas ejecting part becomes completely visible from a rear side in the direction in which the airbag is deployed.

In addition, according to a fourth aspect of the invention, briefly speaking, there is provided a side impact protection airbag system as set forth in the first or second aspect of the invention, wherein the retainer is fixed to the vehicle by a locking member in the vicinity of the outer side of the occupant, and wherein the opening in the wall part is provided in a location where the gas ejecting part becomes totally invisible from a vehicle's front side in a direction which intersects a locking direction of the locking member at right angles but the gas ejecting part becomes completely visible from a vehicle's rear side in the same direction.

By providing the opening in the location which satisfies the condition set forth in the third or fourth aspect of the invention, the wall part is provided between the gas ejecting part and the end portion of the dividing part which lies on the side facing the fixing end portion of the airbag in an ensured fashion, so as to ensure the advantage provided by the first or second aspect of the invention. Namely, the occurrence of the problem that the inflation gas ejected from the gas ejecting holes towards the dividing part is made to strike forcibly and directly the dividing part to damage the driving part can be suppressed. In addition, the flowing direction of the inflation gas ejected from the gas ejecting holes can be changed to the two directions which follow the axis of the gas ejecting part by the portion which covers the retainer at the fixing end portion of the airbag in an ensured fashion, and hence, the inflation gas can be supplied more into the first chamber than into the second chamber so as to inflate the first chamber at the higher internal pressure than the second chamber.

In addition, the third aspect of the invention differs from the fourth aspect of the invention in that the position of the opening in the retainer is specified on the different bases. In the former, the opening position is specified based on the airbag deploying direction, whereas in the latter, the opening position is specified based on the locking direction of the locking member, that is, the attaching direction of the retainer to the vehicle. Although the opening position is represented differently, the aforesaid advantage can be obtained by either the former base or the latter base.

In the event that the opening position is specified based on the latter, the opening can be positioned in a wider range than a case where the opening position is specified based on the former. However, in the event that a configuration according to a fifth aspect of the invention, that is, a configuration in which the locking direction of the locking member is a direction which intersects the deploying direction of the airbag at right angles, the third and fourth aspects of the invention can only provide the same range where the opening is to be positioned.

According to a sixth aspect of the invention, briefly speaking, there is provided a side impact protection airbag system as set forth in any of the first to fifth aspect of the invention, wherein of both end portions of the wall part, at least an end portion which lies closer to the interruption wall is made to open.

According to the configuration described above, at least part of the inflation gas which has struck the interruption wall to be deflected to change its flowing direction can be led from the end portion of the wall part which lies in the vicinity of the interruption wall and which is made to open towards the one chamber.

According to a seventh aspect of the invention, briefly speaking, there is provided a side impact protection airbag system as set forth in any of the first to sixth aspects of the invention, wherein a check valve for restricting a flow of the inflation gas from the first chamber to the second chamber is provided between the fixing end portion and the end portion of the dividing part which lies on the side facing the fixing end portion.

According to the configuration described above, even though the inflation gas ejected from the inflator and having emerged from the retainer to flow into the first chamber attempts to pass through the gap between the fixing end portion and the end portion of the dividing part which lies on the side facing the fixing end portion in the airbag so as to flow into the second chamber, the attempted flow is restricted by the check valve. Because of this, the occurrence of the problem can be suppressed that the internal pressure that has once been increased is reduced by the inflation gas flowing into the second chamber (flowing in the reverse direction) so as to reduce the difference in internal pressure between the two chambers.

According to an eighth aspect of the invention, briefly speaking, there is provided a side impact protection airbag system as set forth in the seventh aspect of the invention, wherein the check valve includes a valve part adapted to extend when the inflation gas is supplied from the inflator towards the first chamber and to be bent when the supply is stopped.

According to the configuration described above, in the check valve, the valve part extends when the inflation gas is supplied from the inflator towards the first chamber, whereby the inflation gas can be made to pass through the check valve so as to flow into the first chamber, whereas when the supply of the inflation gas from the inflator to the first chamber, the valve part is bent, and a flow path of the inflation gas within the check valve is closed.

According to a ninth aspect of the invention, briefly speaking, there is provided a side impact protection airbag system as set forth in the eighth aspect of the invention, wherein the check valve is formed by a piece of fabric into a cylindrical shape which is made to open at both ends, wherein the check valve is disposed in such a manner that one open end faces the first chamber and the other open end faces the second chamber, and wherein a portion lying in the vicinity of the one open end constitutes the valve part which is bent by a difference in internal pressure between the two chambers.

According to the configuration described above, when the inflation gas is supplied from the inflator towards the first chamber, the whole of the check valve including the valve part is inflated into the cylindrical shape which is made to open at both the ends thereof by the pressure of the inflation gas. The valve part is made to extend, and the inflation gas is allowed to pass through the flow path within the check valve to flow into the first chamber. On the contrary to this, when the supply of the inflation gas from the inflator is stopped, the valve part is closed and bent by the different in internal pressure between the two chambers. The flow path within the check valve is closed, and the inflation gas within the first chamber is restricted from passing through the flow path within the check valve to flow into the second chamber (flow in the reverse direction). In this way, the check valve can be realized by the extremely simple configuration. Since the valve part is extended or bent by the pressure of the inflation gas, any means for driving the valve part does not have to be provided additionally.

According to the aspects of the invention, in the side impact protection airbag system in which the interior space of the airbag is divided into at least the two chambers by the dividing part, the occurrence of the problem that the inflation gas ejected from the gas ejecting part strikes forcibly and directly the dividing part to damage the dividing part can be suppressed by the simple retainer configuration without using any additional member.

BRIEF DESCRIPTION OF THE DRAWINGS

FIG. 12 is a sectional view showing a sectional construction taken along the line Y-Y in FIG. 11.

FIG. 13 is a sectional view showing a check valve and the vicinity thereof when a supply of an inflation gas G is stopped from the state shown in FIG. 12.

FIG. 14A to 14C are sectional plan views showing other examples in which an opening is formed in different positions from that in the embodiment.

DETAILED DESCRIPTION OF THE PREFERRED EMBODIMENTS

Hereinafter, referring to FIGS. 1 to 13, an embodiment into which the invention is embodied will be described.

Note that in the following description, a traveling direction (an advancing direction) of a vehicle is referred to as front.

Figure 1:
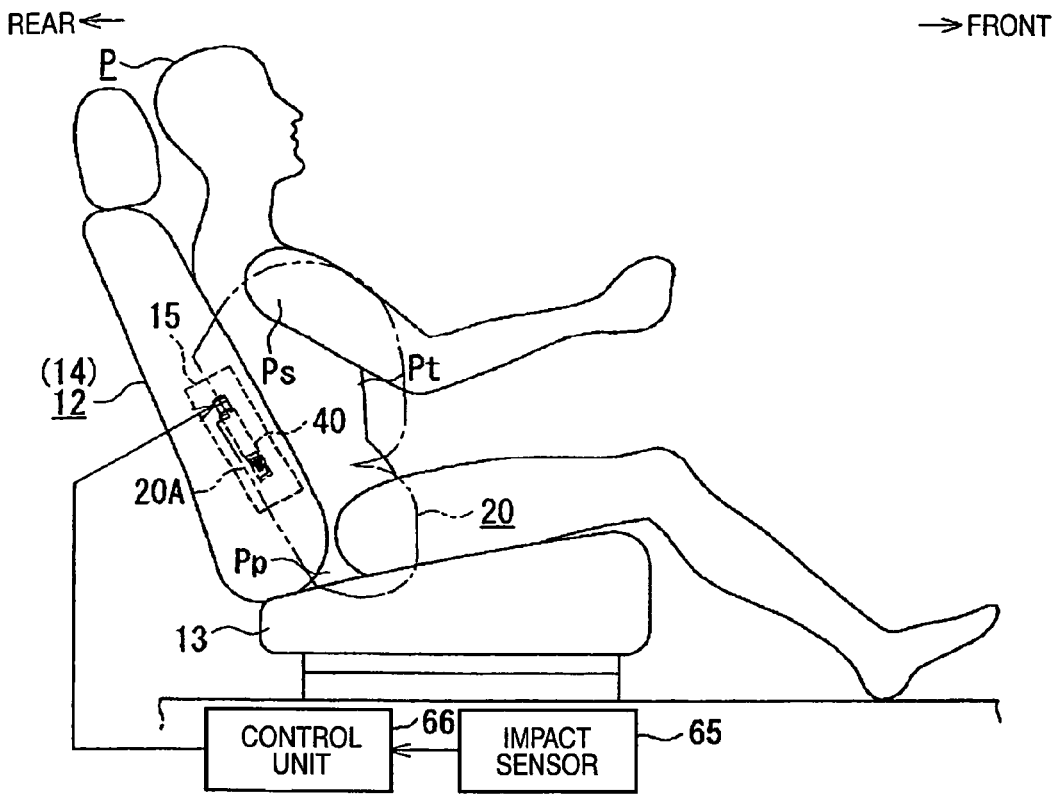
FIG. 1 is a schematic side view of a vehicle seat equipped with a side impact protection airbag system in an embodiment into which the invention is embodied.
Figure 2:
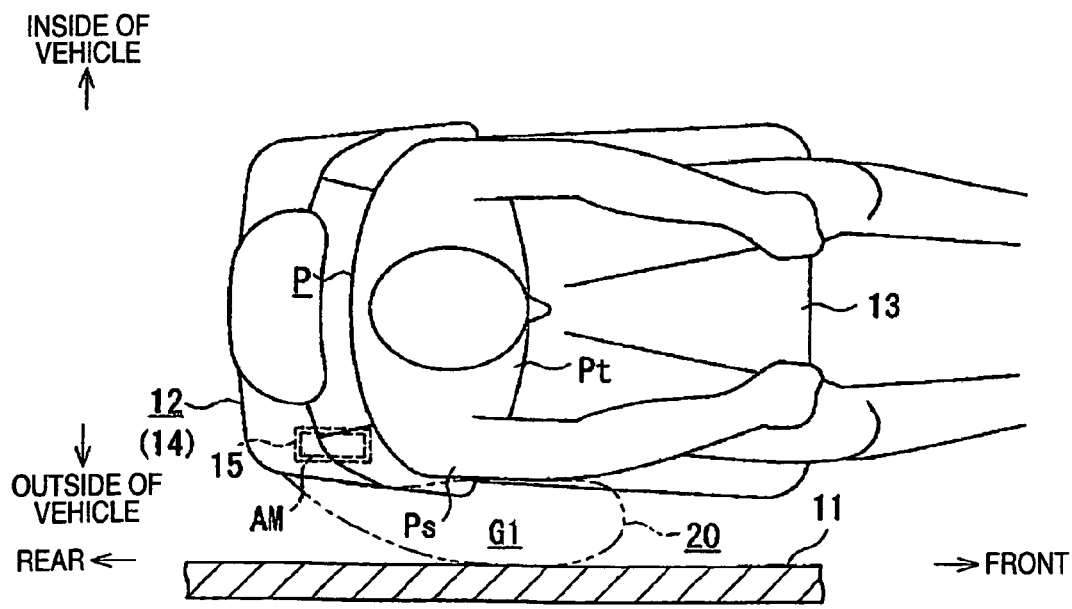
FIG. 2 is a schematic sectional plan view showing a positional relationship between the vehicle seat and a body side portion.

As is shown in at least one of FIGS. 1 and 2, a vehicle seat 12 is disposed in the vicinity of an inner side (an upper side in FIG. 2) of a body side portion 11 of a vehicle. Here, the body side portion 11 denotes a member disposed at a side portion of the vehicle. For example, a body side portion 11 associated with a front seat is a front side door, a center pillar (a B pillar) and the like. In addition, a body side portion 11 associated with a rear seat denotes a rear portion of a rear side door, a C pillar, a front portion of a rear wheel house, a rear quarter portion and the like.

Figure 3:
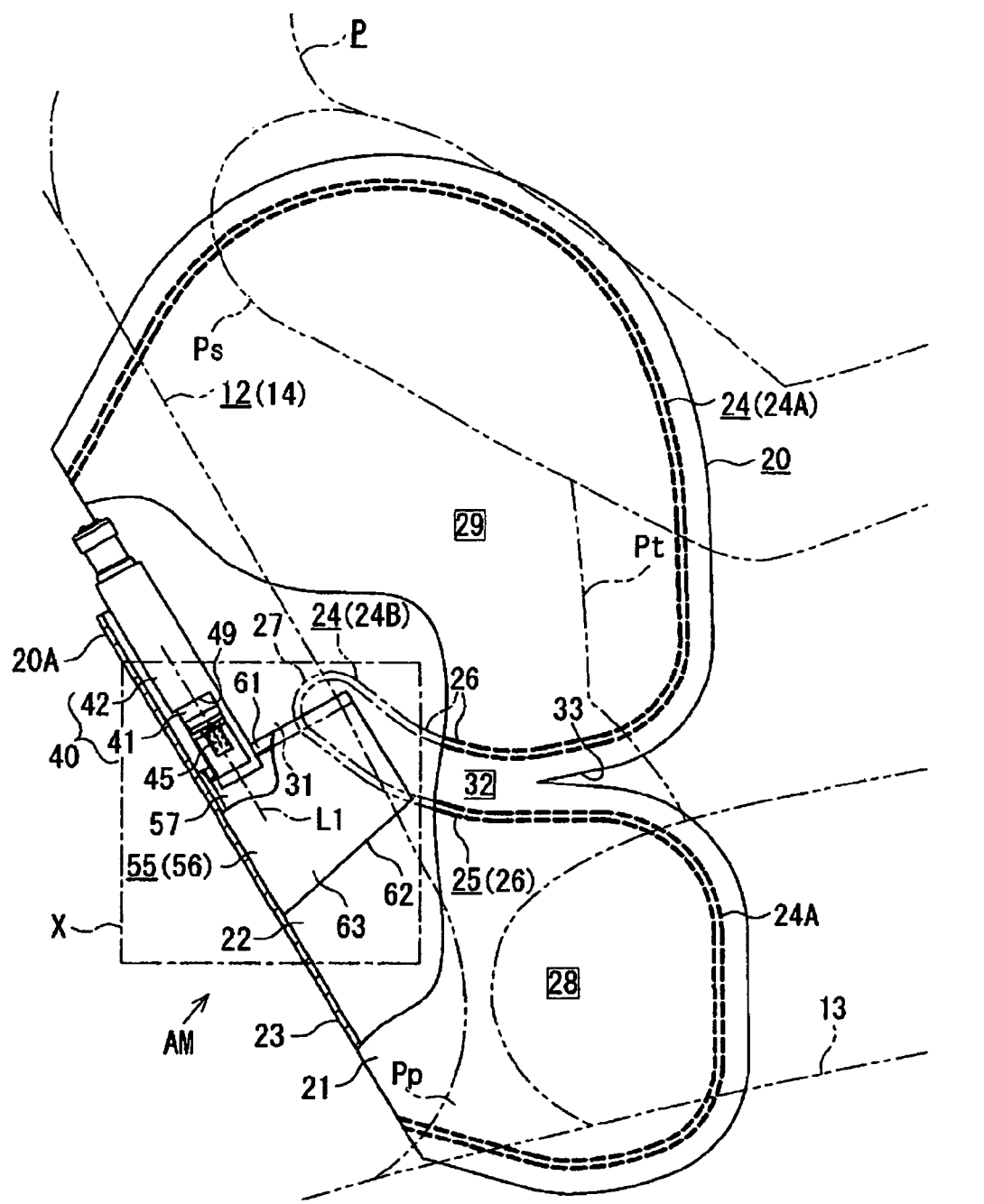
FIG. 3 is a schematic side view showing an airbag module in such a state that an airbag is deployed together with an occupant.

The vehicle seat 12 is made up of a seat cushion (a seating portion) 13 and a seatback (a back resting portion) 14 which is erected from a rear side of the seat cushion 13 and which has a reclining mechanism (whose illustration is omitted). An accommodating portion 15 is provided in a side portion of the seatback 14 on an outer side thereof, and an airbag module AM which makes up a main part of a side impact protection airbag system or, simply, a side airbag system is accommodated in the accommodating portion 15. The accommodating portion 15 is situated in a position lying in the vicinity of an outer side of an occupant P seated in the vehicle seat 12. As is shown in FIG. 3, the airbag module AM includes, as main constituent members, an airbag 20 and an inflator assembly 40.

Next, each of these constituent members will be described. Here, in this embodiment, when terms such as "vertical direction" and "longitudinal direction" are used, they are referred to based on the seatback 14 of the vehicle seat 12. The direction in which the seatback 14 is erected is referred to as the "vertical direction" and a direction which intersects a substantially longitudinal direction of the vehicle at right angles relative to the vertical direction is referred to as the "longitudinal direction." Normally, since the seatback 14 is used in such a state that it is inclined to the rear, the "vertical direction" is, strictly speaking, not a perpendicular direction but is slightly inclined therefrom. Similarly, the "longitudinal direction" is, strictly speaking, not a horizontal direction but is slightly inclined therefrom.

<Airbag>

Figure 9:
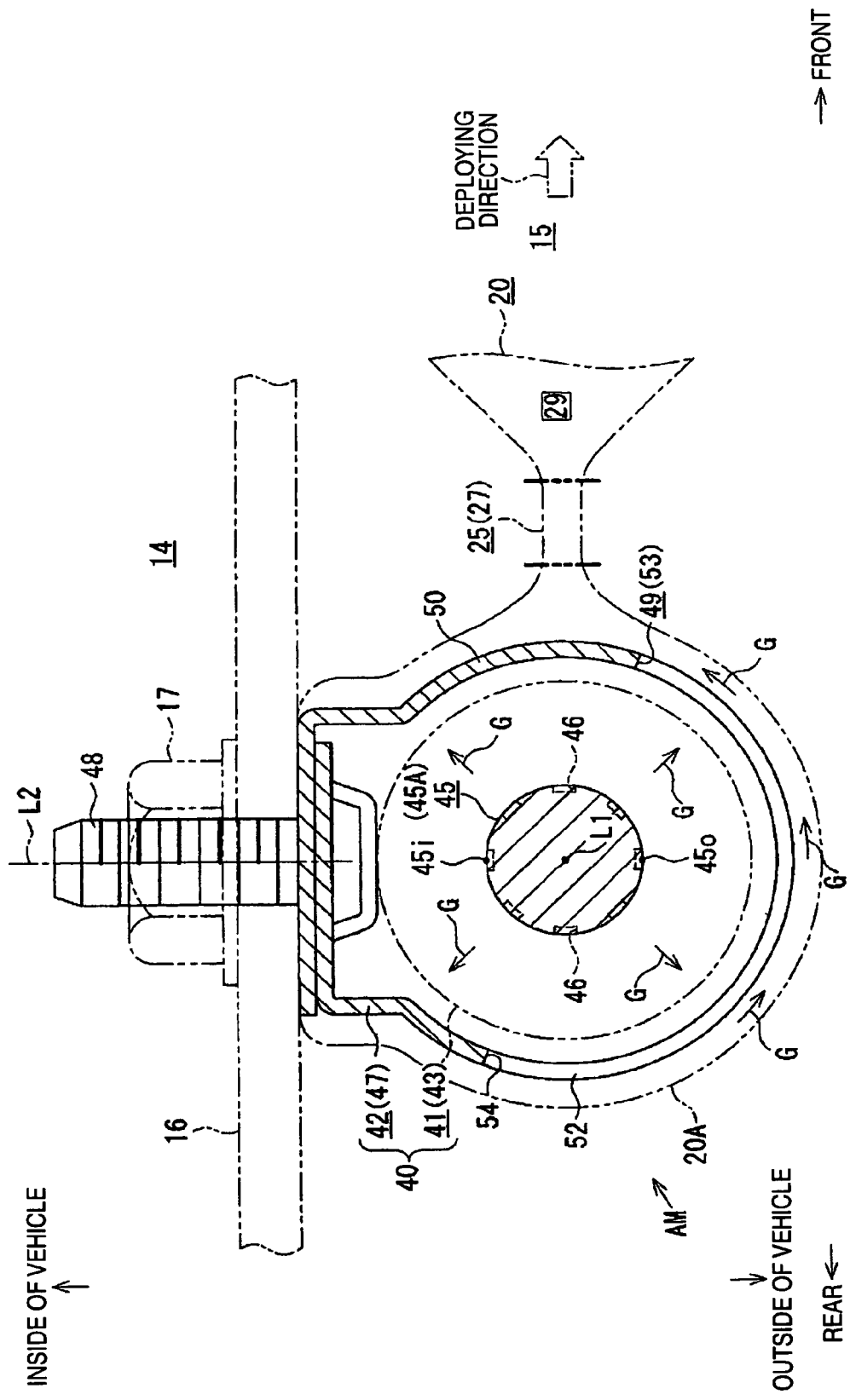
FIG. 9 is a schematic sectional plan view of a portion of the inflator assembly which lies in the vicinity of a dividing part of the airbag.
Figure 10:
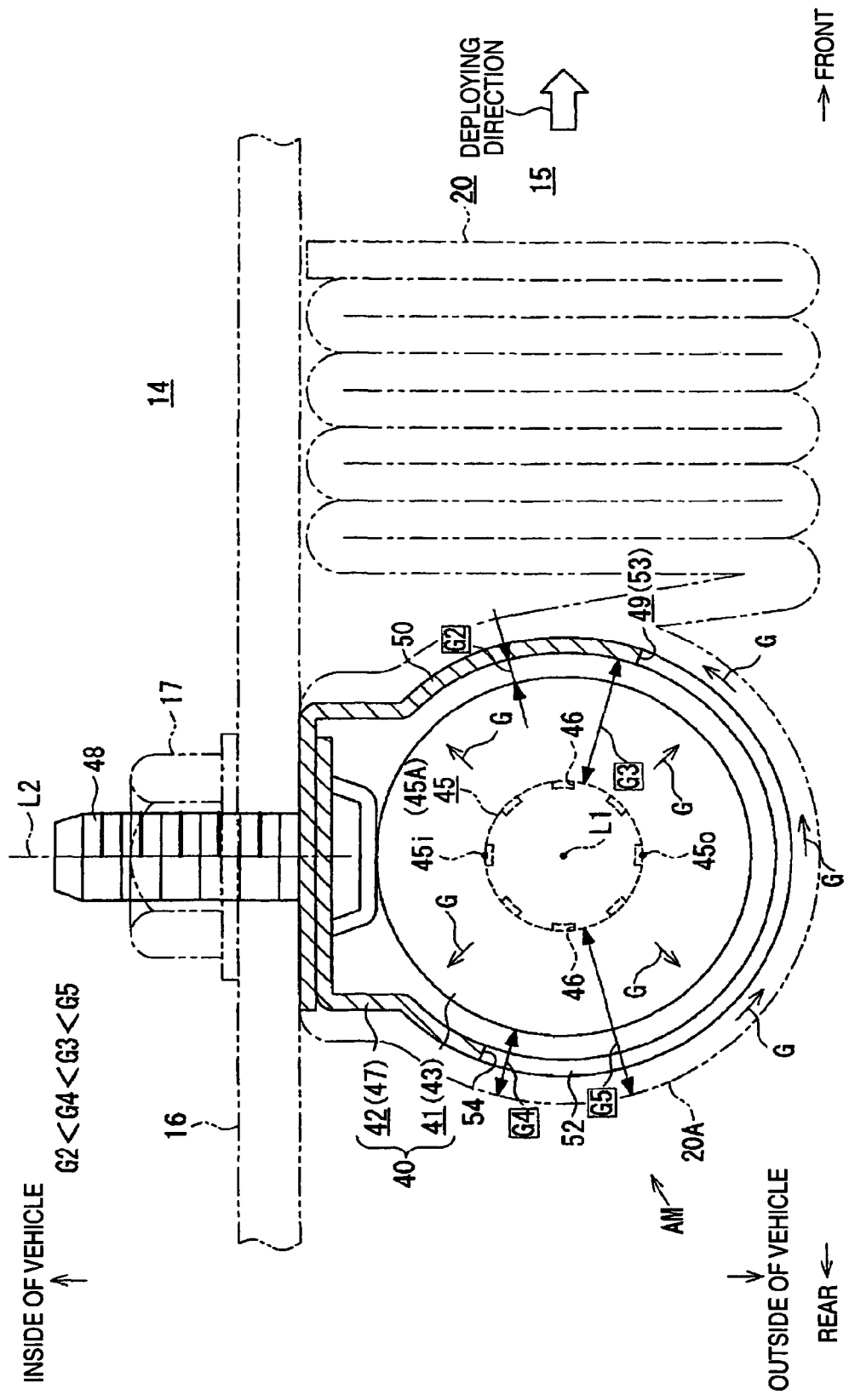
FIG. 10 is a schematic sectional plan view of a portion of the inflator assembly which lies further upwards than the dividing part of the airbag.

As is shown in at least one of FIGS. 1 and 2, when an impact is applied to the side portion 11 from an outside of the vehicle, the airbag 20 is inflated and deployed by an inflation gas G (refer to FIGS. 9 and 10). Then, the airbag 20 projects substantially forwards from the accommodating portion 15 with part thereof (a fixing end portion 20A) left fixed in place within the accommodating portion and is inflated to be deployed in a gap G1 defined between the vehicle seat 12 and the body side portion 11 to thereby restrain the occupant P for protection from the impact. The airbag 20 inflates and deploys to the front of the vehicle, which is referred to as a front in its deploying direction. As is shown in at least one of FIGS. 3 and 4, the airbag 20 is formed by overlapping a pair of base fabrics 21, 22 which are connected together along a rear side 23 which extends substantially in the vertical direction one on the other in a vehicle width or transverse direction and joining both the base fabrics 21, 22 to form a bag-like configuration.

As the base fabrics 21, 22, a material which is highly strong and so flexible as to be folded easily, for example, a fabric made by the use of polyester fibers or polyamide fibers is suitable. The shape and size of both the base fabrics 21, 22 is set in such a manner that when the airbag 20 is inflated and deployed between the vehicle seat 12 and the body side portion 11, the airbag 20 can cover a wide area expanding from a pelvis portion Pp to a chest portion Pt and a shoulder portion Ps. In FIG. 3, in order for the internal base fabric 22 to be shown, as well, the external base fabric 21 is shown as being partially cutaway.

Figure 4:
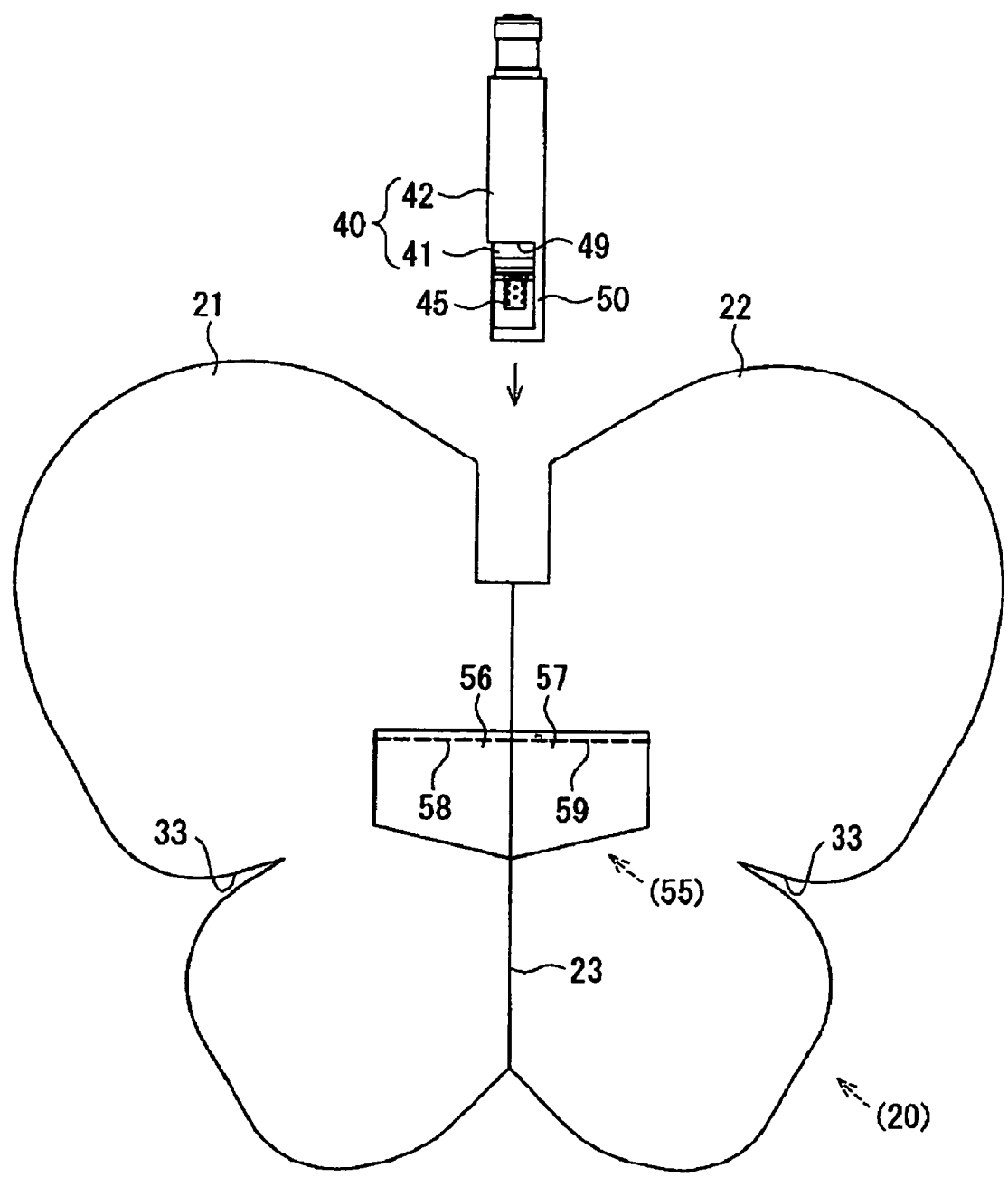
FIG. 4 is a schematic front view showing a pair of base fabrics expanded flat and an inflator assembly.

In addition, the airbag 20 may be such that a pair of base fabrics 21, 22 which are independent of each other (which are separated transversely from each other along the side 23 as a boundary as viewed in FIG. 4) are overlapped one on the other in the transverse direction, and both the base fabrics 21 22 are joined together to be formed into a bag-like configuration.

As is shown in FIG. 3, both the base fabrics 21, 22 are joined in the way described above along a joined part 24. This joined part 24 is indicated by a thick broken line (refer to reference numeral 24A) in a location where the external base fabric 21 is not cutaway, while the joined part 24 is indicated by a chain double-dashed line (refer to reference numeral 24B) in a location where the external base fabric 21 is cutaway, whereby the internal base fabric 22 is allowed to appear. Most of the joined part 24 is provided along circumferential edge portions of both the base fabrics 21, 22, and part thereof is provided in a location which lies further deeper into an interior of the airbag 20 than the circumferential edge portion. A space (an interior space of the airbag 20) which lies between both the base fabrics 21, 22 and is surrounded by the joined part 24 constitutes a portion which is inflated by the inflation gas G. A rear portion of the interior space, that is, a portion in the vicinity of the side 23 corresponds to the "fixing end portion 20A" described in the claims of the invention.

The part of the joined part 24 constitutes a dividing part 25 which divides the interior space of the airbag 20 into two upper and lower chambers. The dividing part 25 can be divided into a pair of extended portions 26 which are made to extend respectively from front ends of both the base fabrics 21, 22 to the rear while being spaced apart in the vertical direction at a substantially constant distance and a connecting portion 27 where rear ends of both the extended portions 26 are connected together. The connecting portion 27 is situated in a position which is slightly spaced apart to the front from rear circumferential edge portions (the side 23) of both the base fabrics 21, 22. This connecting portion 27 corresponds to the "end portion of the dividing part 25 which lies on a side facing the fixing end portion 20A" described in the claims of the invention.

The chamber lying lower than the dividing part 25 constitutes a "pelvis portion protecting chamber 28" which is inflated and deployed at a relatively high internal pressure in the vicinity of mainly an outer side of the pelvis portion Pp of the occupant P to restrain and protect the pelvis portion Pp. In addition, the chamber lying upper than the dividing part 25 constitutes a "chest protecting chamber 29" which is inflated and deployed at a lower internal pressure than the pelvis portion protecting chamber 28 in the vicinity of mainly an outer side of the chest portion Pt to protect the chest portion Pt. The pelvis portion protecting chamber 28 corresponds to the "first chamber" described in the claims of the invention, and the chest portion protecting chamber 29 corresponds to the "second chamber."

The joined part 24 which includes the dividing part 25 is formed by sewing securely both the base fabrics 21, 22 with sewing threads. In addition, the joined part 24 may be formed by a means which is different from one using the sewing threads, for example, a means which uses an adhesive.

Portions on both the base fabrics 21, 22 which are surrounded by the dividing part 25 (both the upper and lower extended portions 26 and the connecting portion 27) constitute a non-inflatable portion 32 where no inflation occurs by the inflation gas G. Furthermore, slits 33 are formed in both the base fabrics 21, 22 to extend into the non-inflatable portion 32 from front ends thereof. With an interfering object existing forwards in the deploying direction of the airbag 20, when the airbag 20 being inflated and deployed comes into contact with the interfering object, the slits 33 work to displace the pelvis portion protecting chamber 28 downwards and the chest portion protecting chamber 29 upwards so as to reduce an effect that would be inflicted on the interfering object.

<Inflator Assembly 40>

Figure 5:
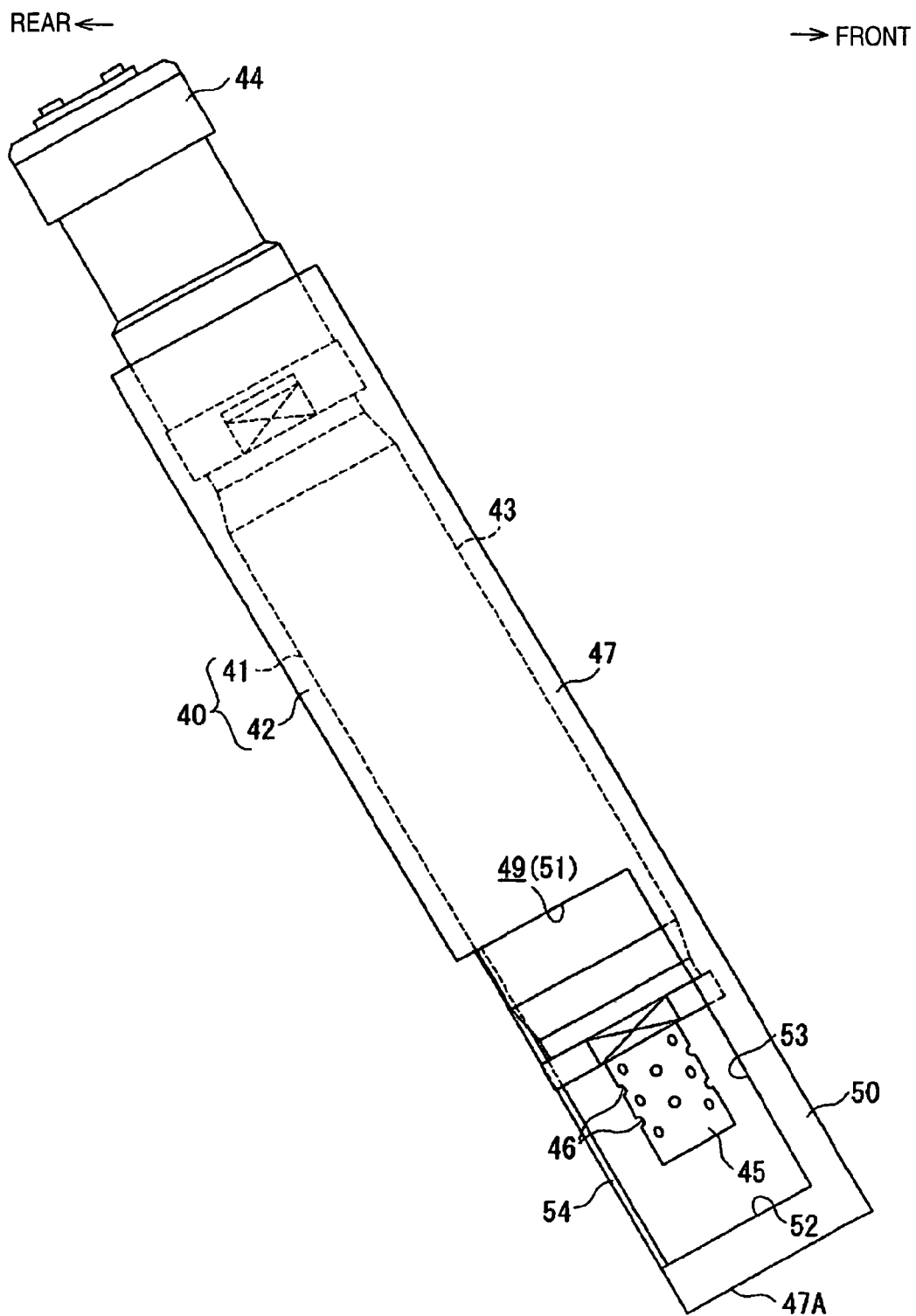
FIG. 5 is a schematic side view of the inflator assembly.

As is shown in FIG. 5, the inflator assembly 40 is made up of an inflator 41 functioning as a gas generation source and a retainer 42 which covers the inflator 41 from an outside thereof. As is shown in FIG. 6, a main part of the inflator 41 is made up of a main body portion 43 which is formed into a substantially cylindrical configuration which is elongated in the vertical direction, and gas generators (whose illustration is omitted) are accommodated in an interior of the main body portion 43 in such a manner that the gas generators react to generate an inflation gas G in response to an activation signal given thereto from an outside thereof.

A connector portion 44 is provided at an upper end of the main body portion 43, and a wiring harness (whose illustration is omitted) is connected to the connector portion 44 to act as a wiring for applying an activation signal to the inflator 41. In addition, a gas ejecting part 45 is provided at a lower end of the main body portion 43, and this gas ejecting part 45 is formed into a substantially cylindrical configuration whose diameter is smaller than that of the main body portion 43. In this embodiment, a diameter D1 of the gas ejecting part 45 is set to on the order of one half a diameter D2 of the main body portion 43. A plurality of gas ejecting holes 46 are provided in an outer circumferential surface 45A of the gas ejecting part 45, and the inflation gas G generated by the gas generators are ejected from the gas ejecting holes so provided in a direction which intersects an axis L1 of the gas generating part 45 at right angles (in a radial direction). These gas ejecting holes 46 are provided along the full circumference of the gas ejecting part 45 at equal angular intervals in a plurality of positions lying along a direction which follows the axis L1 of the gas ejecting part 45 (substantially in the vertical direction). This gas ejecting part 45 is situated at one end portion (a lower end portion) with respect to an axial direction of the inflator 41.

Note that in place of the type of inflator 41 which adopts the gas generators, a type of inflator 41 may be used in which a bulkhead of a high-pressure gas cylinder in which a highly pressurized gas is loaded is broken by powder or the like so as to eject an inflation gas G.

Figure 6:
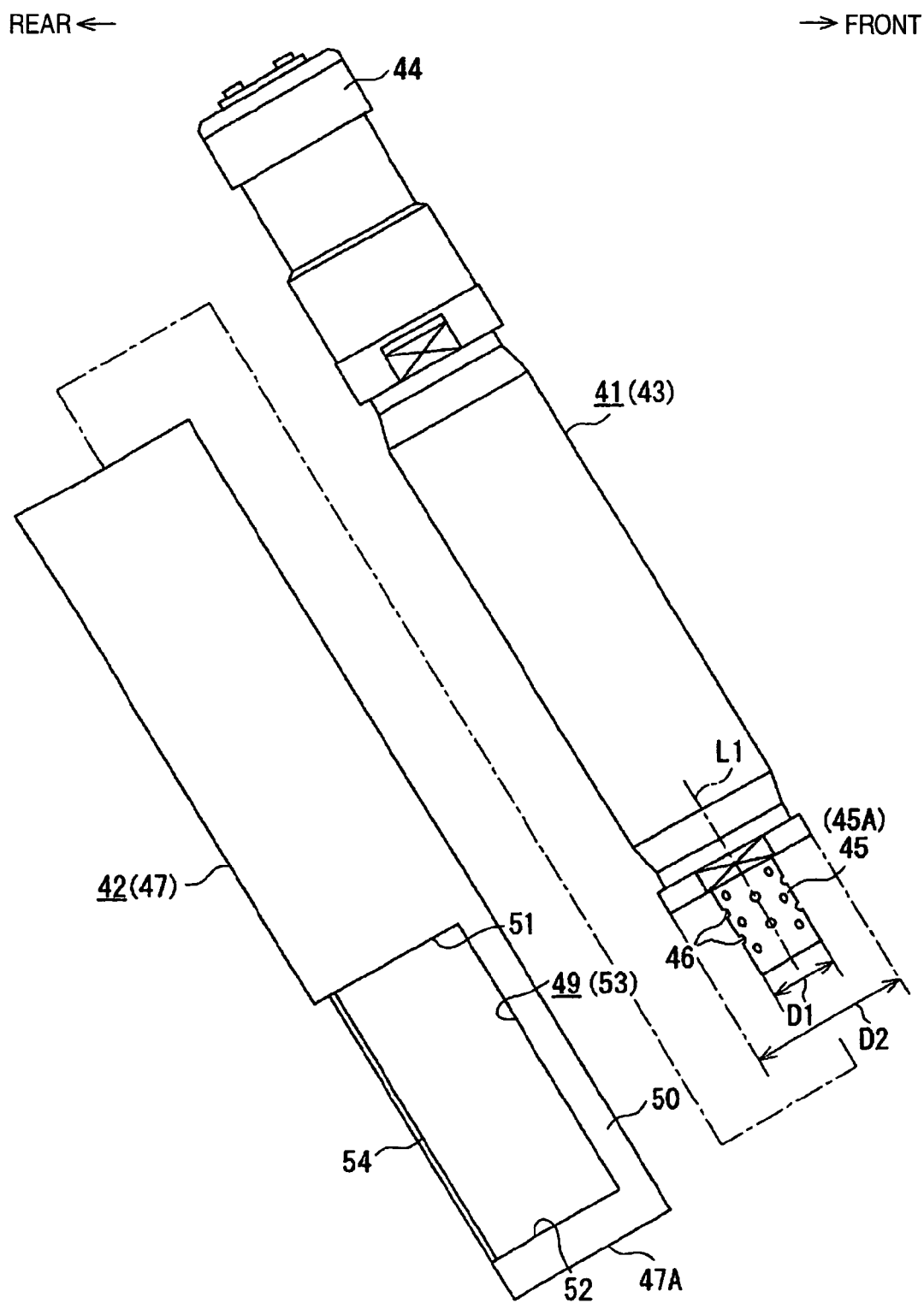
FIG. 6 is a schematic side view of an inflator and a retainer which are constituent parts of the inflator assembly.
Figure 7:
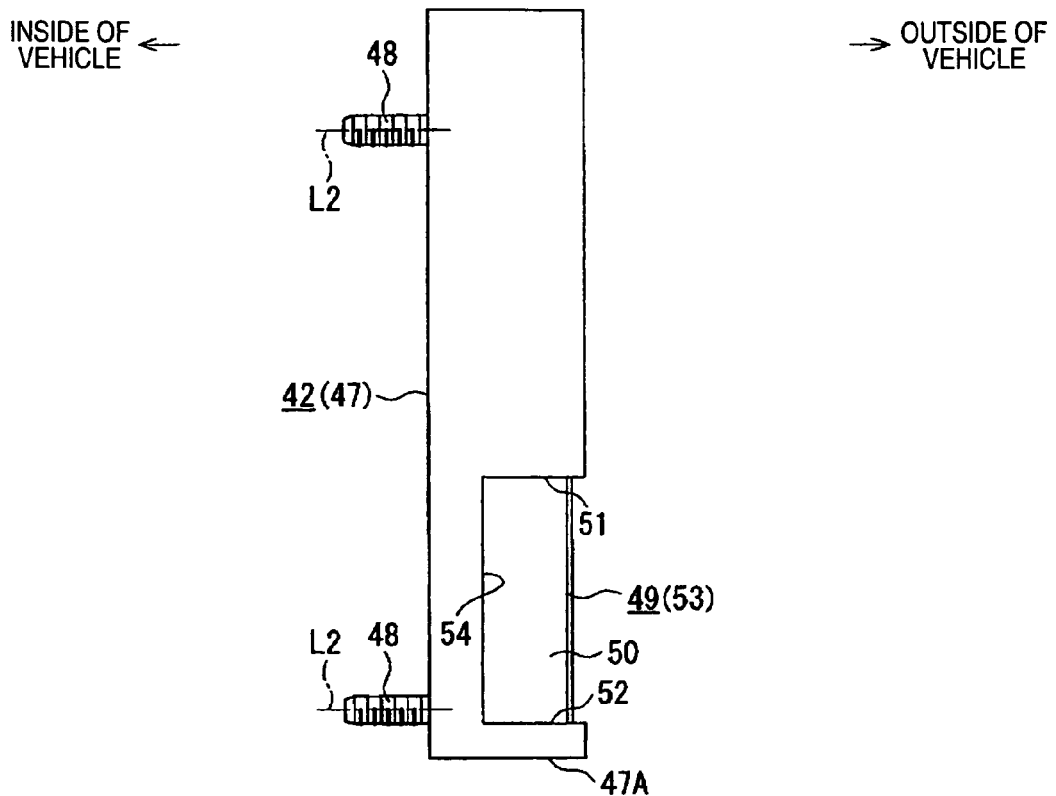
FIG. 7 is a schematic rear view of the retainer.
Figure 8:
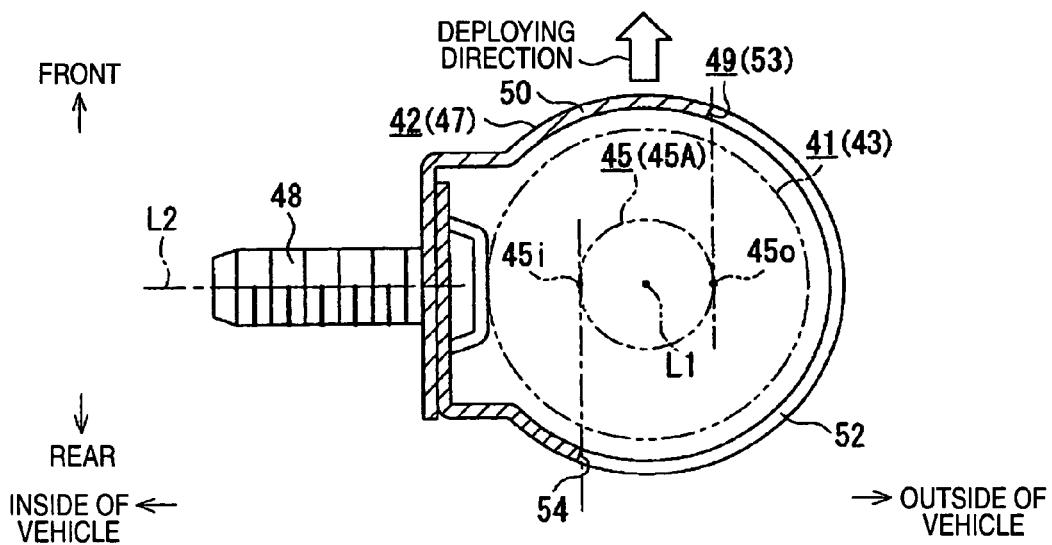
FIG. 8 is a schematic sectional plan view of the retainer.

On the other hand, as is shown in at least one of FIGS. 6 to 8, the retainer 42 is a member having not only a function as a diffuser but also a function to fix the inflator 41 to a seat frame 16 (refer to chain double-dashed lines in FIG. 9) in the seatback 14 together with the airbag 20. The retainer 42 has a tubular wall part 47 which holds the inflator 41 to cover it from an outside thereof. Of upper and lower end portion of the tubular wall part 47, at least an end portion which lies closer to an interruption wall 50, which will be described later, or the lower end portion is made to open, and a lower end of the tubular wall part 47 constitutes an open end 47A. Incidentally, in this embodiment, the upper end portion of the tubular wall part 47 is similarly made to open. The whole of the retainer 42 which includes the tubular wall part 47 is formed by bending a sheet material such as a sheet metal.

A plurality of (two in this embodiment) bolts 48 are fixed to the wall part 47 as locking members for attaching the wall part 47 to the vehicle, more specifically, the seat frame 16. These bolts 48 extend in a direction which intersects the axis L1 of the gas ejecting part 45 or transversely inwards. Here, a direction in which the bolts 48 and their axes extend is a direction which intersects the deploying direction of the airbag 20 at right angles.

An opening 49 which permits the passage of at least part of the inflation gas G from the gas ejecting part 45 is provided in a position on the wall part 47 which lies further upwards than the open end 47A and in the vicinity of the gas ejecting portion 45 of the inflator 41. The opening 49 includes a pair of upper and lower edge portions which are each formed into an arc which extends about the axis L1 of the gas ejecting part 45 and a pair of front and rear edge portions which become parallel to the same axis L1. Here, to distinguish these four edge portions from each other, of the pair of upper and lower arc-shaped edge portions, the one situated on the upper side is referred to as an upper horizontal edge portion 51, and the one situated on the lower side is referred to as a lower horizontal edge portion 52. In addition, of the pair of front and rear straight-line edge portions, the one situated on the front side is referred to as a front vertical edge portion 53, and the one situated on the rear side is referred to as a rear vertical edge portion 54.

The opening 49 makes part of the gas ejecting holes 46 on the inflator 41 visible from the wall part 47. This opening 49 is provided in a location which satisfies the following condition 1 (a condition 2).

Condition 1: The location should be such that the gas ejecting part 45 is totally invisible from a front side (an upper side in FIG. 8) in the deploying direction of the airbag 20 but the gas ejecting part 45 is completely visible from a rear side (a lower side in FIG. 8) in the deploying direction of the airbag 20.

However, this is premised on that no other member exists between the viewer and the inflator assembly 40. Namely, although the inflator assembly 40 is wrapped by the airbag 20 in reality, here, it is premised that no airbag 20 is provided and that only the inflator assembly 40 is viewed.

The condition 1 above can also be expressed as follows.

Condition 2 according to a different expression: The location should be such that the gas ejecting part 45 is totally invisible from a front side in a direction which intersects the axis L2 of the bolt 48 at right angles or a direction which intersects a locking direction of the locking member at right angles but the gas ejecting part 45 is completely visible from a rear side in the same direction.

Although the condition 1 (the condition 2) is expressed in the different ways between the condition 1 and the condition 2, the conditions 1 and 2 are actually the same in this embodiment in which the direction which intersects the axis L2 of the bolt 48 at right angles coincides with the deploying direction of the airbag 20 as has been described above.

To satisfy the condition mentioned above, the position of the upper horizontal edge portion 51 of the opening 49 with respect to the vertical direction is set to lie in the same or upper position than an upper end of the gas ejecting part 45 of the inflator 41 held by the retainer 42. In addition, the position of the lower horizontal edge portion 52 with respect to the vertical direction is set to lie in the same or lower position than a lower end of the gas ejecting part 45 in the same state. The position of the front vertical edge portion 53 with respect to the transverse direction is set to lie in the same or transversely further outward position than a transversely outermost generatrix 45o of the gas ejecting part 45. The position of the rear vertical edge portion 54 with respect to the transverse direction is set to lie in the same or transversely further inward position than a transversely innermost generatrix 45i of the gas ejecting part 45 (refer to FIG. 8).

In this embodiment, as is shown in FIG. 5, the position of the upper horizontal edge portion 51 with respect to the vertical direction is set to lie in the upper position than an upper end portion of the gas ejecting part 45, and the position of the lower horizontal edge portion 52 is set to lie in the lower position than a lower end portion of the gas ejecting part 45. In addition, as is shown in FIG. 8, the position of the front vertical edge portion 53 with respect to the transverse direction is set to lie in the same position as the transversely outermost generatrix 45o of the gas ejecting part 45. The position of the rear vertical edge portion 54 with respect to the transverse direction is set to lie in the same position as the transversely innermost generatrix 45i of the gas ejecting part 45.

In this way, by providing the opening 49 in the location on the wall part 47, the circumferential location on the wall part 47 which is separate from the opening 49 is made to function as the interruption wall 50 which interrupts the passage of the inflation gas G to the dividing part 25 side (the connecting portion 27 side), and this interruption wall 50 is provided between the gas ejecting part 45 and the connecting portion 27.

The inflator assembly 40 having the configuration described above is, as is shown in FIG. 3, provided in the vicinity of a fixing end portion 20A of the airbag 20 in such a posture that the axis L1 of the gas ejecting part 45 is inclined to extend substantially in the vertical direction. Most of the inflator assembly 40 is situated in an interior of the chest portion protecting chamber 29. The gas ejecting part 45 of the inflator 41 and the opening 49 in the retainer 42 is situated at the fixing end portion 20A of the airbag 20, or, more specifically, in a position between the interruption wall 50 and the connecting portion 27 and closer to the side 23. In addition, a gap defined between the interruption wall 50 and the connecting portion 27 constitutes a communicating portion 31 which establishes a communication between rear portions of the pelvis portion protecting changer 28 and the chest portion protecting chamber 29.

Figure 11:
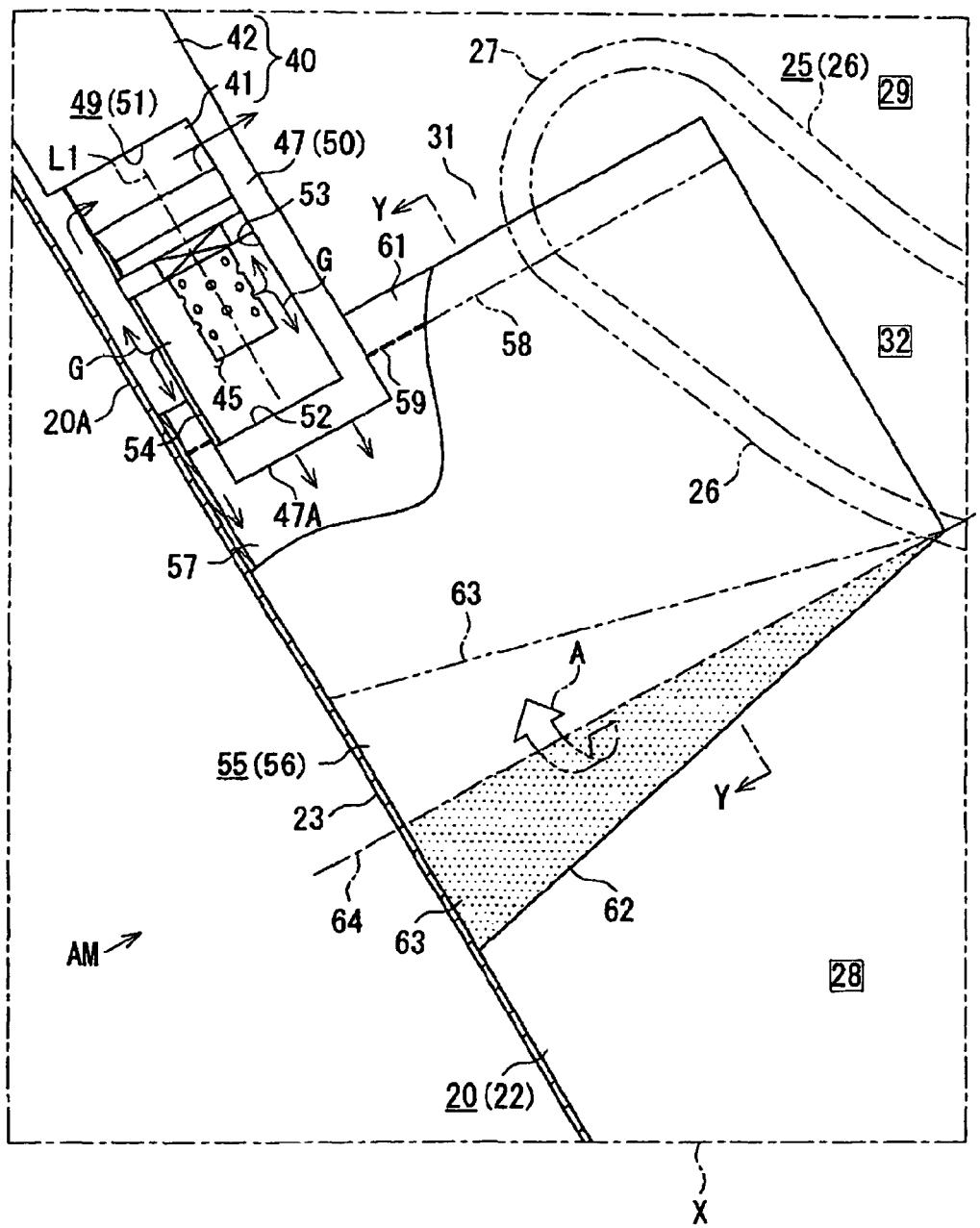
FIG. 11 is a schematic side view showing an portion X in FIG. 3 in an enlarged fashion.

Furthermore, a check valve 55 for restricting the flow of the inflation gas G from the pelvis portion protecting chamber 28 into the chest portion protecting portion 29 is provided between the fixing end portion 20A of the airbag 20 and the connecting portion 27 of the dividing part 25. In this embodiment, to satisfy this condition, the check valve 55 is provided in a position which lies at an upper portion in the pelvis portion protecting chamber 28 and at an inwardly deeper portion (a rear portion) of the non-inflatable portion 32. The check valve 55 is formed into a tubular configuration which is made to open at both upper and lower ends thereby by a piece of fabric such as a woven fabric. More specifically, as is shown in at least one of FIGS. 4 and 11, the check valve 55 is formed by overlapping in the transverse direction a pair of pieces of fabric 56, 57 which are connected to each other along the side 23 of the airbag 20 which extends substantially in the vertical direction and joining together both the pieces of fabric 56, 57 into a tubular configuration which is made to open at both upper and lower ends thereof. In FIG. 11, in order to illustrate the internal piece of fabric 57, as well, the external piece of fabric 56 is shown as being partially cutaway. Part of the dividing part 25 is used to join the pieces of fabric 56, 57 together. Namely, although the dividing part 25 is originally made to join both the base fabrics 21, 22 in such a state that the interior space of the airbag 20 is divided into the two upper and lower chambers (the pelvis portion protecting chamber 28, the chest portion protecting chamber 29), here, the part of the dividing part 25 is used to sew together the pieces of fabric 56, 57 and the base fabrics 21, 22.

Furthermore, the external piece of fabric 56 is joined to the external base fabric 21 at an upper end portion thereof by a joined portion 58 (indicated by a thick broken line in FIG. 4, and indicated by a chain double-dashed line in FIG. 11). This joined portion 58 is formed by sewing together the piece of fabric 56 and the base fabric 21 with a sewing thread. Similarly, the internal piece of fabric 57 is joined to the internal base fabric 22 at an upper end portion thereof by a joined portion 59 (indicated by a thick broken line both in FIGS. 4 and 11). This joined portion 59 is formed by sewing together the piece of fabric 57 and the base fabric 22 with a sewing thread.

As has been described above, since the external piece of fabric 56 and the external base fabric 21 are joined to each other by the joined portion 58 and part of the dividing part 25, the inflation gas G is not allowed to flow from the pelvis portion protecting chamber 28 to the chest portion protecting chamber 29 through a gap between the piece of fabric 56 and the base fabric 21 or vice versa. Similarly, since the internal piece of fabric 57 and the internal base fabric 22 are joined to each other by the joined portion 59 and part of the dividing part 25, the inflation gas G is not allowed to flow from the pelvis portion protecting chamber 28 to the chest portion protecting chamber 29 through a gap between the piece of fabric 57 and the base fabric 22 or vice versa. The inflation gas G is allowed to flow from the pelvis portion protecting chamber 28 to the chest portion protecting chamber 29 or vice versa only by flowing through a gap between the pieces of fabric 56, 57 as its flow path.

Here, a portion between upper end portions of both the pieces of fabric 56, 57 is made to function as an upper open end 61 of the check valve 55 and a portion between lower end portions of both the pieces of fabric 56, 57 is made to function as a lower open end 62 of the check valve 55. The upper open end 61 is situated in the vicinity of the rear of the connecting portion 27 and faces the chest portion protecting chamber 29. In addition, the lower open end 62 is situated at an upper portion in the pelvis portion protecting chamber 28 and in the vicinity of the rear of the connecting portion 27. Then, the retainer 42 enters an upper portion of the check valve 55 only at its lower end portion (refer to FIG. 11).

In addition, the pieces of fabric 56, 57 are joined respectively to the base fabrics 21, 22 at their upper end portions and front end portions. The pieces of fabric 56, 57 are not joined to the base fabrics 21, 22 in other positions than those portions. A lower portion of the check valve 55 that is configured as has been described above is made to be bent more easily than its other portions. Furthermore, the upper open end 61 of the check valve 55 intersects the side 23 of the airbag 20 at right angles, while the lower open end 62 is inclined to intersect the same side 23 at an acute angle. Because of this, the lower portion (a portion indicated by dots (•) in FIG. 11) of the check valve 55 including the lower open end 62 is made easy to be bent upwards as indicated by an arrow A along particularly a bending line 64 indicated by an alternate long and short dash line. One of reasons for this is as follows. Namely, if the lower open end 62 were not inclined but were formed parallel to the upper open end 61 at a lower position than shown in FIG. 11, the open end 62 would interfere with the dividing part 25 or, more specifically, the lower extended portion 26 so as to be made difficult to be bent. In contrast to this, in this embodiment, as has been described above, since the open end 61 is inclined, the interference of the open end 61 with the lower extended portion 26 is made difficult to occur, and the open end 61 is made easy to be bent.

A portion of the check valve 55 lying lower than the bending line 64 is made to constitute a valve part 63 which extends when the inflation gas G is supplied from the inflator 41 towards the pelvis portion protecting chamber 28 and bends in response to the occurrence of a difference in internal pressure between the two chambers 28, 29 when the supply of the inflation gas G is stopped.

In addition, the check valve 55 is provided only to restrict the flow of the inflation gas G from the pelvis portion protecting chamber 28 to the chest portion protecting chamber 29 and is not provided to suppress the forcible contact of the inflation gas G from the inflator 41 with the connecting portion 27 of the dividing part 25.

Incidentally, as is shown in FIG. 10, the airbag module AM which has the airbag 20 and the inflator assembly 40 as its main constituent members is accommodated compact by the airbag 20 in the deployed state (refer to FIG. 3) being folded. This is because the airbag module AM is made to be accommodated in the accommodating portion 15 which is limited in size in the seatback 14 in an ensured fashion.

The airbag module AM which is accommodated in the state described above is attached to the seat frame 16 within the seatback 14 by the bolts 48 which are fixed to the retainer 42 and is then fastened thereto by nuts 17. The attaching direction (the locking direction) of the bolt 48 (the locking member) intersects the deploying direction of the airbag 20 as has been described above.

The side airbag system includes an impact sensor 65 and a control unit 66 shown in FIG. 1, in addition to the aforesaid airbag module AM. The impact sensor 65 is made up of an acceleration sensor and is attached to the body side portion 11 (refer to FIG. 2) or the like of the vehicle. The impact sensor 65 detects an impact applied to the body side portion 11 from an outside thereof. The control unit 66 controls the operation of the inflator 41 based on a detection signal from the impact sensor 65.

The side airbag system of this embodiment is configured as has been described heretofore. In this side airbag system, when an impact equal to or larger than a predetermined value is applied to the body side portion 11 of the vehicle and the application of such an impact is detected by the impact sensor 65, an activation signal for activation of the inflator 41 is outputted from the control unit 66 to the inflator 41 based on the detection signal which signals the detection. In the inflator 41, as is shown in at least one of FIGS. 10 and 11, the gas generators generate an inflation gas G which is high in temperature and pressure in response to the activation signal and the inflation gas G so generated is then ejected from the plurality of gas ejecting holes 46 of the gas ejecting part 45 in every direction which intersects the axis L1 of the gas ejecting part 45 at right angles (the radial direction).

The tubular wall part 47 of the retainer 42 is placed over the inflator 41 from the outside thereof, the opening 49 in the wall part 47 permits the passage of the inflation gas G from the gas ejecting holes 46, and the circumferential portion on the wall part 47 which is separate from the portion where the opening 49 is formed constitutes the interruption wall 50 which interrupts the passage of the inflation gas G. Consequently, in the wall part 47, the flowing direction (the outlet direction) of the inflation gas G is determined depending upon the position of the opening 49.

Here, since the gas ejecting part 45 and the opening 49 are situated in the vicinity of the rear of the connecting portion 27 of the dividing part 25, there is a fear that the inflation gas G which is ejected from the gas ejecting holes 46 and passes through the opening 49 may be caused to strike forcibly and directly the connecting portion 27.

In this embodiment, however, since the opening 49 is provided in the location which satisfies the condition 1 (the condition 2), the interruption wall 50 is provided between the gas ejecting part 45 and the connecting portion 27. Because of this, the inflation gas G which is ejected forwards from the gas ejecting holes 46 to be directed towards the dividing part 45 strikes the interruption wall 50 to be deflected and changes its flowing direction. Consequently, there occurs no such situation that the inflation gas G ejected from the gas ejecting holes 46 strikes forcibly and directly the connecting portion 27.

In addition, a gap defined between the wall part 47 of the retainer 42 and the inflator 41 can constitute a passage for the inflation gas G from part of the gas ejecting holes 46. Because of this, the inflation gas G which has been ejected from the gas ejecting holes 46 and then struck the wall part 47 (the interruption wall 50) changes its flowing direction to two directions (upwards and downwards) which follow the axis L1 of the gas ejecting part 45. Then, the inflation gas G which has changed its flowing direction in the way described above is supplied to the pelvis portion protecting chamber 28 and the check valve 55 (the chest portion protecting chamber 29).

In this embodiment, in the wall part 47, since the main body portion 43 which is larger in diameter than the gas ejecting part 45 is situated on the chest portion protecting chamber 29 side and the gas ejecting part 45 is situated on the pelvis portion protecting chamber 28 side, a gap G2 defined between the wall part 47 and the main body portion 43 is made smaller than a gap G3 defined between the wall part 47 (the interruption wall 50) and the gas ejecting part 45. Because of this, the inflation gas G which has been ejected from part of the gas ejecting holes 46 and struck the interruption wall 50 changes its flowing direction to a direction which follows the axis L1 of the gas ejecting part 45. However, the inflation gas G in question is made difficult to flow between the wall part 47 and the main body portion 43 which define the narrow gap G2, that is, towards the chest portion protecting chamber 29 but is made easy to flow between the interruption wall 50 and the gas ejecting part 45 which define the wide gap G3, that is, towards the check valve 55 (the pelvis portion protecting chamber 28). As a result, the inflation gas G which has struck the interruption wall 50 to be deflected to change its flowing direction in the way described above passes through the lower open end 47A of the wall part 47 and flows more into the check valve 55 (the pelvis portion protecting chamber 28) than into the chest portion protecting chamber 29.

In addition, a gap defined between the retainer 42 and the portion which covers the inflator 41 and the retainer 42 at the fixing connecting portion 20A of the airbag 20 can constitute a passage for the inflation gas G from part of the gas ejecting holes 46. Because of this, the inflation gas G from the part of the gas ejecting holes 46 passes directly through the opening 49 and flows in the direction which intersects the axis L1 of the gas ejecting part 45 (the radial direction) without the flow of the inflation gas G being interrupted by the wall part 47. This inflation gas G strikes the fixing end portion 20A of the airbag 20 to thereby be deflected to change its flowing direction to the two directions (upwards and downwards) which follow the axis L1 of the gas ejecting part 45. One part of the inflation gas G whose flowing direction has been changed in the way described above flows downwards along the fixing end portion 20A of the airbag 20 and then flows into an interior of the check valve 55, whereas the other part of the inflation gas G flows upwards along the fixing end portion 20A of the airbag 20 and afterwards flows into the chest portion protecting chamber 29. Here, a gap defined between the fixing end portion 20A and the opening 49 remains the same or constant in any position along the axis L1 of the gas ejecting part 45. This is also true with a gap defined between the fixing end portion 20A and the other portion than the opening 49 on the wall part 47. Consequently, the amount of the inflation gas G which emerges from the opening 49 and afterwards flows along the fixing end portion 20A and the check valve 55 into the pelvis portion protecting chamber 28 is basically the same as the amount of the inflation gas G which flows into the chest portion protecting chamber 29.

However, the inflation gas G which does not emerge from the opening 49 and flows along the fixing end portion 20A and the wall part 47 through the gap between the inflator 41 and the retainer 42 passes through the lower open end 47A of the wall part 47 and flows more into the pelvis portion protecting chamber 28 than into the chest portion protecting chamber 29 from the relationship between the gaps G2, G3 (G3>G2).

Consequently, in consideration of the total of the inflation gas G which emerges from the opening 49 and the inflation gas G which does not emerge from the opening 49, the inflation gas G which flows along the fixing end portion 20A flows more into the pelvis portion protecting chamber 28 than into the chest portion protecting chamber 29.

To express this in a different way, a gap G4 defined between the fixing end portion 20A of the airbag 20 and the main body portion 43 is made smaller than a gap G5 defined between the fixing end portion 20A and the gas ejecting part 45. Because of this, the inflation gas G which has been ejected from the gas ejecting part 45 to strike the fixing end portion 20A is deflected thereby to change its flowing direction to a direction which follows the axis L1 of the gas ejecting part 45. however, the same inflation gas G is made difficult to flow between the fixing end portion 20A and the main body portion 43 which define the narrow gap G, that is, towards the chest portion protecting chamber 29 but is made easy to flow between the fixing end portion 20A and the gas ejecting part 45 which define the wide gap G5, that is, towards the pelvis portion protecting chamber 28. As a result, the inflation gas G which has struck the fixing end portion 20A to thereby deflected to change its flowing direction in the way described above flows more into the pelvis portion protecting chamber 28 than into the chest portion protecting chamber 29.

In this way, similarly, the inflation gas G which flows along the interruption wall 50 of the wall part 47 and the inflation gas G which flows along the fixing end portion 20A of the airbag 20 are also supplied more into the check valve 55 and the pelvis portion protecting chamber 28 than into the chest portion protecting chamber 29.

In addition, in the check valve 55 into which the inflation gas G is divided in such a way as to flow more, as is shown in FIG. 12, the whole of the check valve 55 including the valve part 63 is inflated into the tubular configuration with both the upper and lower open ends 61, 62 made to open by virtue of the high pressure of the inflation gas G, the same inflation gas G passes through the flow path within the check valve 55 to flow into the pelvis portion protecting chamber 28. The respective portions of the airbag 20 which is folded in the accommodated state are inflated to be deployed by the inflation gas G while being unfolded from the folded state. The airbag 20 inflates and deploys in the gap G1 defined between the body side portion 11 of the vehicle and the vehicle seat 12 with its fixing end portion 20A left fixed in place in the accommodating portion 15 (refer to a chain double-dashed line in FIG. 2). As this occurs, since the inflation gas G is supplied by a smaller amount into the chest portion protecting chamber 29 than into the pelvis portion protecting chamber 28, the chest portion protecting chamber 29 inflates and deploys at a smaller internal pressure than the pelvis portion protecting chamber 28. Consequently, as to the resistance to impact of the side portion of the human body, since the pelvis portion Pp is generally superior to a body portion lying upper than the pelvis portion, for example, the chest portion Pt, an impact applied to the occupant P by the airbag 20 which has so inflated and deployed becomes smaller at the chest portion Pt than at the pelvis portion Pp.

When the downward supply of inflation gas G from the inflator 41 is stopped, as is shown in FIG. 13, the valve part 63 of the check valve 55 is closed and bent due to a difference in internal pressure which has occurred then between the pelvis portion protecting chamber 28 and the chest portion protecting chamber 29. The flow path within the check valve 55 is closed by the valve part 63 so bent, and the inflation gas G which has been ejected from the inflator 41 and flowed temporarily into the pelvis portion protecting chamber 28 is restricted from flowing into the chest portion protecting chamber 29 (from flowing in the reverse direction) through the check valve 55.

According to the embodiment that has been described heretofore, the following advantages can be obtained.

(1) In the side airbag system in which the interior space of the airbag 20 is divided into the two chambers 28, 29 by the dividing part 25, the circumferential portion on the wall part 47 of the retainer 42 which is separated from the portion where the opening 49 is formed is made to constitute the interruption wall 50 which interrupts the passage of the inflation gas G to the dividing part 25 side. In addition, this interruption wall 50 is provided between the gas ejecting part 45 and the connecting portion 27 of the dividing part 25 (refer to FIG. 11). Because of this, the flowing direction of the inflation gas G ejected from part of the gas ejecting holes 46 towards the connecting portion 27 is changed by the interruption wall 50, whereby the forcible and direct contact of the inflation gas G with the connecting portion 27 can be suppressed. In this way, even in the event that an additional member such as an inner tube or reinforcement fabric is not used, the problem that the inflation gas G damages the dividing part 25 can be solved by the simple retainer configuration.

(2) The inflator 41 is used which includes the cylindrical main body portion 43 which is larger in diameter than the gas ejecting part 45 and is disposed in such a manner that the gas ejecting part is made to be situated on the pelvis portion protecting chamber 28 side and the main body portion 43 is made to be situated on the chest portion protecting chamber 29 side. Because of this, the inflation gas G which has been deflected by the interruption wall 50 to thereby change its flowing direction is supplied more into the check valve 55 and the pelvis portion protecting chamber 28 than into the chest portion protecting chamber 29, whereby the pelvis portion protecting chamber 28 can be inflated at the higher internal pressure than the chest portion protecting chamber 29. The airbag 20 can be inflated in the pressure distribution which matches the resistance to impact of the side portion of the occupant P, whereby the pelvis portion Pp and the chest portion Pt of the occupant P can be protected from the impact resulting from the sideways collision effectively.

In addition, in this embodiment, the distribution of the inflation gas G is implemented by the retainer 42 and part (the fixing end portion 20A) of the airbag 20. Because of this, the necessity can be obviated of providing separately a device for distributing the inflation gas G from the inflator 41 more into the pelvis portion protecting chamber 28 than into the chest portion protecting chamber 29, thereby making it possible to obtain a merit or advantage that the interior construction of the airbag 20 does not become complex.

(3) The opening 49 in the wall part 47 of the retainer 42 is provided in the location where the gas ejecting part 45 becomes totally invisible from the front side in the deploying direction of the airbag 20 but the gas ejecting part 45 becomes completely visible from the rear side in the same deploying direction (refer to FIGS. 9 and 10).

To express this in a different way, in this embodiment in which the retainer 42 is fixed to the vehicle (the seat frame 16) with the bolts 48 whose axis L2 extends in the direction which intersects the deploying direction of the airbag 20 at right angles, the opening 49 is provided in the location where the gas ejecting part 45 becomes totally invisible from the front side in the direction which intersects the axis L2 at right angles but the gas ejecting part 45 becomes completely visible from the rear side in the same direction.

In this way, by providing the opening 49 in the location which satisfies the condition described above, the interruption wall 50 of the wall part 47 is positioned between the gas ejecting part 45 and the connecting portion 27 of the dividing part 25 in the ensured fashion, where the advantages described under (1) and (2) above can be ensured. Namely, the phenomenon can be suppressed in which the inflation gas G ejected from part of the gas ejecting holes 46 towards the dividing part 25 strikes forcibly and directly the connecting portion 27 to damage the same. In addition, the flowing direction of the inflation gas G ejected from the part of the gas ejecting holes 46 can be changed to the two directions which follow the axis L1 of the gas ejecting part 45 by the interruption wall 50 and the fixing end portion 20A in the ensured fashion. Consequently, the inflation gas G can be supplied more into the pelvis portion protecting chamber 28 than into the chest portion protecting chamber 29, whereby the pelvis portion protecting chamber 28 can be inflated at the higher pressure than the chest portion protecting chamber 29.

(4) Of the upper and lower end portions of the wall part 47, the end portion which lies closer to the interruption wall 50 or the lower end portion is made to open, so that the lower end of the wall part 47 is made to constitute the open end 47A. Because of this, at least part of the inflation gas G which has struck the interruption wall 50 to be deflected to thereby change its flowing direction can be led from the open end 47A towards the pelvis portion protecting chamber 28.

(5) The check valve 55 for restricting the gas flow from the pelvis portion protecting chamber 28 to the chest portion protecting chamber 29 is provided between the fixing end portion 20A of the airbag 20 and the connecting portion 27 of the dividing part 25. Because of this, the occurrence of the problem can be suppressed that the internal pressure in the pelvis portion protecting chamber 28 which has been increased once is decreased by the inflation gas G flowing (back) into the chest portion protection chamber 29 so as to reduce the difference in internal pressure between the two chambers (the pelvis portion protecting chamber 28 and the chest portion protecting chamber 29).

(6) The check valve 55 is adopted which includes the valve part 63 adapted to extend when the inflation gas G from the inflator 41 is being supplied towards the pelvis portion protecting chamber 28 and to be bent when the same supply of inflation gas G is stopped. Because of this, the valve part 63 is made to extend when the inflation gas G from the inflator 41 is ejected so as to open the flow path inside the check valve 55, whereby the inflation gas G can be supplied to the pelvis portion protecting chamber 28 through the flow path. In contrast to this, the valve part 63 is put into the bent state when the same supply of inflation gas G is stopped, so as to close the flow path inside the check valve 55, the inflation gas G which has flowed into the pelvis portion protecting chamber 28 can be restricted from flowing (back) into the chest portion protecting chamber 29 through the check valve 55.

(7) The check valve 55 is used which is formed by the pieces of fabric 56, 57 into the tubular configuration which is made to open at both the upper and lower ends thereof, and the valve part 63 which is bent by the difference in internal pressure between the two chambers (the pelvis portion protecting chamber 28 and the chest portion protecting chamber 29) is made up of the lower portion of the check valve 55. Because of this, the check valve 55 can be realized by the very simple configuration described above. In addition, since the valve part 63 is made to be extended and bent by virtue of the pressure of the inflation gas G, the necessity is obviated of providing separately a device for driving the valve part 63.

(8) The pieces of fabric 56, 57 of the check valve 55 are joined to the base fabrics 21, 22 only at their upper end portions and front end portions. By adopting this configuration, the portion of the check valve 55 which is not joined to the base fabrics 21, 22, that is, the lower portion (the valve part 63) can be made easier to be bent than the other portions.

Note that the invention can be embodied into other embodiments which will be described below.

The position of the opening 49 in the retainer 42 may be changed to a position different from that described in the embodiment. Specifically, the position of the upper horizontal edge portion 51 of the opening 49 with respect to the vertical direction may be the same or higher than the upper end portion of the gas ejecting part 45. The position of the lower horizontal edge portion 52 with respect to the vertical position may be the same or lower than the lower end portion of the gas ejecting part 45.

On the other hand, the position of the front vertical edge portion 53 with respect to the transverse direction may be transversely further outwards than the transversely outermost generatrix 45*o* on the outer circumferential surface 45A of the gas ejecting part 45. As this occurs, the front vertical edge portion 53 may be positioned on or in the vicinity of the axis L2 of the bolt 48 as is shown, for example, in FIG. 14A. In addition, the front vertical edge portion 53 may be situated further rearwards than the gas ejecting part 45. FIGS. 14B and 14C show examples in which a front vertical edge portion 53 is set to lie further rearwards than a gas ejecting part 45 and to be in the same position as a transversely outermost generatrix 45*o* on an outer circumferential surface 45A.

In contrast to this, the position of the rear vertical edge portion 54 with respect to the transverse direction may be transversely further inwards than the transversely innermost generatrix 45*i* on the outer circumferential surface 45A of the gas ejecting part 45. As this occurs, the rear vertical edge portion 54 may be positioned in the vicinity of the fixing position 47B of the bolt 48 on the wall part 47, as is shown in FIG. 14B.

In addition, FIG. 14C shows an example in which an opening 49 is made narrowest in the transverse direction. In this case, a front vertical edge portion 53 is set in the same position as a transversely outermost generatrix 45*o* on an outer circumferential surface 45A of a gas ejecting part 45, and a rear vertical edge portion 54 is set in the same position as a transversely innermost generatrix 45*i* on the outer circumferential surface 45A.

Figure 15:
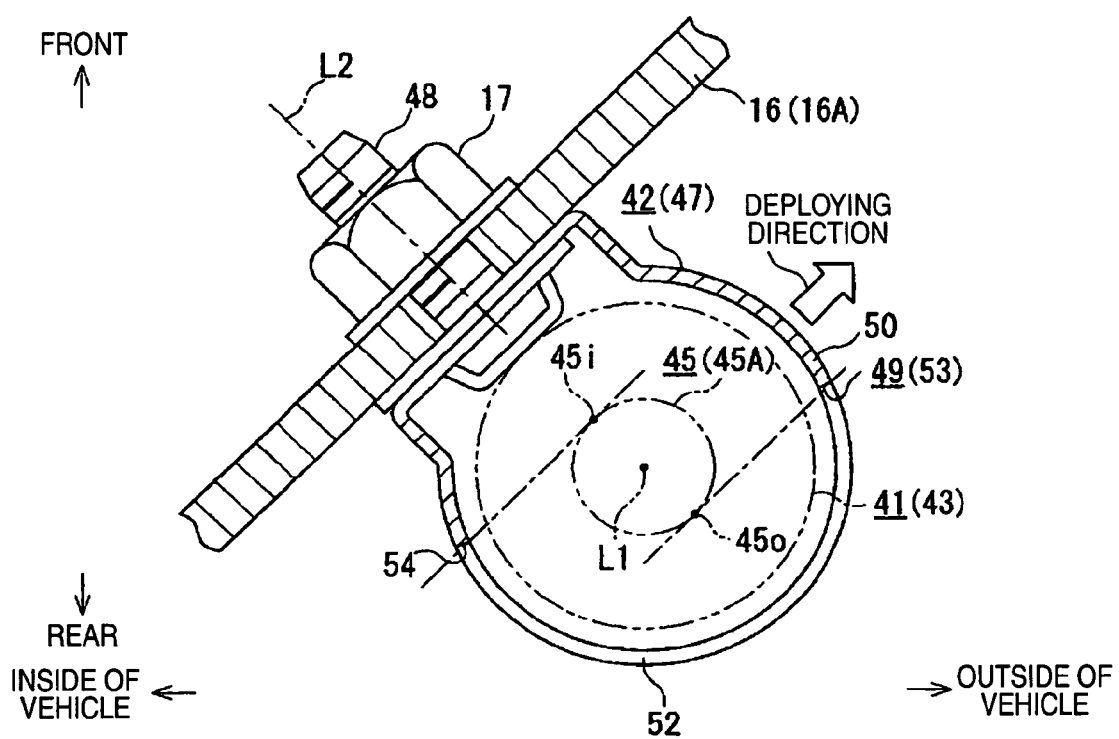
FIG. 15 is a sectional plan view showing another example of a retainer in which a bolt is locked (fastened) as a locking direction thereof in a direction which differs from a direction which intersects a longitudinal direction of a vehicle at right angles.

- The invention can also be applied to a side airbag system of a type in which a locking member of a retainer 42 is locked on to the vehicle in a direction different from the longitudinal direction of the vehicle. FIG. 15 shows an example thereof. In FIG. 15, an inclined portion 16A is provided on part of a seat frame 16 to intersect obliquely the longitudinal direction of the vehicle. In addition, a bolt 48 (a locking member) of a retainer 42 is inserted in such a state that the bolt 48 intersects the inclined portion 16A at right angles and is fastened by a nut 17. In this case, the locking direction of the locking member (the bolt 48) is a direction which intersects the inclined portion 16A at right angles and a direction which intersects obliquely the longitudinal direction of the vehicle. Even in the case of this example, however, the locking direction of the locking member, that is, the direction in which an axis L2 of the bolt 48 extends becomes a direction which intersects the deploying direction of an airbag 20 at right angles. Also, in this case, the same advantage as that of the embodiment can be obtained.

Note that in FIG. 15, 45*i*, 45*o* are such as to denote positions along the axis L2, and 45*i* denotes a transversely outermost generatrix on an outer circumferential surface 45A of a gas ejecting part 45, while 45*o* denotes a transversely innermost generatrix.

- The check valve 55 may be omitted.
- The invention may also be applied to a side airbag system in which a locking direction is made to be a direction which is different from a direction which intersects the deploying direction of an airbag 20 at right angles, so that a locking member is locked on to the vehicle in that direction.
- The invention may also be applied to a side airbag system in which a retainer 42 is fixed to the vehicle (a seat frame 16) by the use of a member different from the bolt 48 as a locking member.
- An inflator 41 may be used in which a gas ejecting part 45 is provided at an intermediate portion with respect to an axial direction of the inflator 41. In this case, as well, the advantage can be obtained that an inflation gas G can be supplied more into a pelvis portion protecting chamber 28 than a chest portion protecting chamber 29.
- An inflator 41 may be used in which a gas ejecting part 45 having a different diameter than that of the embodiment, provided that the gas ejecting part 45 should be smaller in diameter than a main body portion 43. In this case, too, a gap G3 can be made larger than a gap G2, whereby an inflation gas G can be supplied more into a pelvis portion protecting chamber 28 than a chest portion protecting chamber 29.
- An inflator 41 may be used in which a main body portion 43 is the same or smaller in diameter than a gas ejecting part 45. Also, in this case, the advantage can be obtained that the problem is suppressed that an inflation gas G ejected from a gas ejecting part 45 strikes forcibly a dividing part 25.
- A retainer 42 may be used in which an upper end portion of a wall part 47 is closed and only a lower end portion is made to open, or a retainer 42 may be used in which both upper and lower end portions of a wall part 47 are closed.
- The whole of the inflator assembly 40 may be provided within an interior of the chest portion protecting chamber 29, on condition that the gas ejecting part 45 and the opening 49 are provided in the vicinity of a position between the fixing end portion 20A of the airbag 20 and the connecting portion of the dividing part 25. In this case, the inflation gas G may be made to be supplied into the pelvis portion protecting chamber 28 mainly from the lower open end 47A of the wall part 47, while the inflation gas G may be made to be supplied into the chest portion protecting chamber 29 from the opening 49. Even in the event that the modification is adopted, the same advantage as that obtained by the embodiment can be obtained.
- The accommodating portion 15 may be provided in a position on the body side portion 11 which lies in the vicinity of the outer side of the occupant P seated in the vehicle seat 12 rather than in the seatback 14.
- The invention can also be applied to a side airbag system in which a lower chamber (the first chamber) is made to constitute a chamber for protecting a body portion lying upper than the pelvis Pp of the occupant P. Even with the side airbag system configured in the way described above, an inflation gas G can properly be distributed into two upper and lower chambers by a simple retainer configuration.
- The invention can also be applied to a side airbag system in which an interior space of an airbag 20 is divided into three or more chambers in a vertical direction by a dividing part 25.

As this occurs, in the event that a lowermost chamber is positioned on an outer side of the pelvis portion Pp of the occupant P to protect the pelvis portion Pp of the occupant P, the remaining chambers lying thereabove may be made to constitute chambers for protecting at least one of body portions of the occupant P such as the chest portion Pt, the abdominal portion, the shoulder portion and the head portion. In addition, the respective chambers may be made to constitute chambers for protecting body portions other than the pelvis portion Pp of the occupant P.

- The invention can also be applied to a so-called "curtain shield" airbag system in which an airbag is accommodated in a roof side rail lying in the vicinity of a side door to be inflated and deployed between the head portion of an occupant and a window in the side door in response to an impact applied from an outside of a vehicle as a result of the vehicle being involved in a sideways collision, an interior space of the airbag being divided in a plurality of chambers by a diving part. In the side airbag system of this type, in most cases, the interior space of the airbag is divided in a plurality of chambers arranged substantially in the longitudinal direction of the vehicle by the dividing part.

In addition to the embodiments described heretofore, technical ideas which can be grasped from the respective embodiments will be described together with advantages provided thereby.

(A) In the side impact protection airbag system according to the first or second aspect of the invention, the opening in the wall part is provided in the location where the gas ejecting part is totally invisible from the front side of the vehicle but the gas ejecting part is completely visible from the rear side of the vehicle.

(B) In the side impact protection airbag system according to the fourth aspect of the invention, the locking member is the bolt fixed to the retainer, and the locking direction of the bolt is a direction which follows the axis of the bolt.

What is claimed is:

1. A side impact protection airbag system comprising:
    an inflator having a substantially cylindrical gas ejecting part and adapted to eject an inflation gas from a plurality of gas ejecting holes on an outer circumferential surface of the gas ejecting part in response to an impact applied to a vehicle from an external direction;
    a retainer having a tubular wall part for holding the inflator to cover the inflator from an outside thereof and an opening which is provided in a position on the wall part which lies in a vicinity of the gas ejecting part so as to permit the passage of at least part of the inflation gas from the gas ejecting part; and
    an airbag whose interior space is divided into at least a first chamber and a second chamber by a dividing part and which is fixed to the vehicle at one end portion thereof as a fixing end portion;
    the gas ejecting part and the opening being provided between the fixing end portion of the airbag and an end portion of the dividing part which lies on a side facing the fixing end portion or in the vicinity thereof, so that the airbag is made to be inflated and deployed towards the vicinity of an outer side of an occupant in a vehicle seat by the inflation gas which is supplied from the retainer into the respective chambers,
    wherein a circumferential portion on the wall part which is separate from the portion where the opening is formed is provided between the gas ejecting part and the end portion of the dividing part which lies on the side facing the fixing end portion as an interruption wall for interrupting the passage of the inflation gas ejected from the gas ejecting holes to the dividing part side, and
    wherein the opening in the wall part is provided in a location where the gas ejecting part becomes totally invisible from a front side in a direction in which the airbag is deployed but the gas ejecting part becomes completely visible from a rear side in the direction in which the airbag is deployed.

2. A side impact protection airbag system as set forth in claim 1, wherein
    the inflator comprises a main body portion which is formed into a cylindrical shape having a larger diameter than the gas ejecting part and is provided in such a state the gas ejecting part is positioned on a side facing the first chamber and the main body portion is positioned on a side facing the second chamber.

3. A side impact protection airbag system as set forth in claim 1, wherein
    of both end portions of the wall part, at least an end portion which lies closer to the interruption wall is made to open.

4. A side impact protection airbag system as set forth in claim 1, wherein
    a check valve for restricting a flow of the inflation gas from the first chamber to the second chamber is provided between the fixing end portion and the end portion of the dividing part which lies on the side facing the fixing end portion.

5. A side impact protection airbag system as set forth in claim 4, wherein
    the check valve comprises a valve part adapted to extend when the inflation gas is supplied from the inflator towards the first chamber and to be bent when the supply is stopped.

6. A side impact protection airbag system as set forth in claim 5, wherein
    the check valve is formed by a piece of fabric into a cylindrical shape which is made to open at both ends, wherein
    the check valve is disposed in such a manner that one open end faces the first chamber and the other open end faces the second chamber, and wherein
    a portion lying in the vicinity of the one open end constitutes the valve part which is bent by a difference in internal pressure between the two chambers.

7. A side impact protection airbag system comprising:
    an inflator having a substantially cylindrical gas ejecting part and adapted to eject an inflation gas from a plurality of gas ejecting holes on an outer circumferential surface of the gas ejecting part in response to an impact applied to a vehicle from an external direction;
    a retainer having a tubular wall part for holding the inflator to cover the inflator from an outside thereof and an opening which is provided in a position on the wall part which lies in a vicinity of the gas ejecting part so as to permit the passage of at least part of the inflation gas from the gas ejecting part; and
    an airbag whose interior space is divided into at least a first chamber and a second chamber by a dividing part and which is fixed to the vehicle at one end portion thereof as a fixing end portion;
    the gas ejecting part and the opening being provided between the fixing end portion of the airbag and an end portion of the dividing part which lies on a side facing the fixing end portion or in the vicinity thereof, so that the airbag is made to be inflated and deployed towards the vicinity of an outer side of an occupant in a vehicle seat by the inflation gas which is supplied from the retainer into the respective chambers, wherein
    a circumferential portion on the wall part which is separate from the portion where the opening is formed is provided between the gas ejecting part and the end portion of the dividing part which lies on the side facing the fixing end portion as an interruption wall for interrupting the passage of the inflation gas ejected from the gas ejecting holes to the dividing part side, wherein
    the retainer is fixed to the vehicle by a locking member in the vicinity of the outer side of the occupant, and wherein
    the opening in the wall part is provided in a location where the gas ejecting part becomes totally invisible from a vehicle's front side in a direction which intersects a locking direction of the locking member at right angles but the gas ejecting part becomes completely visible from a vehicle's rear side in the same direction.

8. A side impact protection airbag system as set forth in claim 7, wherein
    the locking direction of the locking member is a direction which intersects the deploying direction of the airbag at right angles.

* * * * *